(12) United States Patent
Charalambides et al.

(10) Patent No.: US 9,868,217 B2
(45) Date of Patent: Jan. 16, 2018

(54) ALL-ELASTOMER 3-AXIS CONTACT RESISTIVE TACTILE SENSOR ARRAYS AND MICROMILLED MANUFACTURING METHODS THEREOF

(71) Applicant: University of Maryland, College Park, MD (US)

(72) Inventors: Alexandros Charalambides, Ellicott City, MD (US); Sarah Bergbreiter, Silver Spring, MD (US); Ivan Penskiy, Adelphi, MD (US)

(73) Assignee: Univeristy of Maryland, College Park, MD (US)

( * ) Notice: Subject to any disclaimer, the term of this patent is extended or adjusted under 35 U.S.C. 154(b) by 0 days.

(21) Appl. No.: 15/257,239

(22) Filed: Sep. 6, 2016

(65) Prior Publication Data

US 2017/0066136 A1    Mar. 9, 2017

Related U.S. Application Data

(60) Provisional application No. 62/214,400, filed on Sep. 4, 2015, provisional application No. 62/332,825, filed on May 6, 2016.

(51) Int. Cl.
*B25J 13/08* (2006.01)
*G01L 1/22* (2006.01)
*G01L 5/22* (2006.01)

(52) U.S. Cl.
CPC .............. *B25J 13/084* (2013.01); *G01L 1/22* (2013.01); *G01L 5/228* (2013.01)

(58) Field of Classification Search
CPC ........... G01L 5/228; G01L 1/22; B25J 13/084
(Continued)

(56) References Cited

U.S. PATENT DOCUMENTS 4,194,097 A * 3/1980 Bradam ............... H01H 13/702
200/5 A
5,060,527 A * 10/1991 Burgess .................. G01L 1/205
338/47
(Continued)

OTHER PUBLICATIONS

Yousef et al., "Tactile sensing for dexterous in-hand manipulation in robotics—A review", Sensors and Actuators A: Physical, 167, pp. 171-187 (2011).
(Continued)

*Primary Examiner* — Max Noori
(74) *Attorney, Agent, or Firm* — George Likourezos, Esq.; Carter, DeLuca, Farrell & Schmidt, LLP

(57) ABSTRACT

At least one tactile sensor includes an insulating layer and a conductive layer formed on the surface of the insulating layer. The conductive layer defines at least one group of flexible projections extending orthogonally from the surface of the insulating layer. The flexible projections include a major projection extending a distance orthogonally from the surface and at least one minor projection that is adjacent to and separate from the major projection wherein the major projection extends a distance orthogonally that is greater than the distance that the minor projection extends orthogonally. Upon a compressive force normal to, or a shear force parallel to, the surface, the major projection and the minor projection flex such that an electrical contact resistance is formed between the major projection and the minor projection. A capacitive tactile sensor is also disclosed that responds to the normal and shear forces.

20 Claims, 18 Drawing Sheets
(18 of 18 Drawing Sheet(s) Filed in Color)

(58) Field of Classification Search
USPC .................................................. 73/862.632
See application file for complete search history.

(56) References Cited

U.S. PATENT DOCUMENTS

| | | | | |
|---|---|---|---|---|
| 6,571,511 | B1* | 6/2003 | Plottnik | B60J 10/00 200/61.44 |
| 8,161,826 | B1* | 4/2012 | Taylor | G01L 1/18 73/862.041 |
| 2003/0030452 | A1* | 2/2003 | Okada | G01L 1/142 324/681 |
| 2008/0237002 | A1* | 10/2008 | Zhang | B25J 13/084 200/61.42 |
| 2009/0004767 | A1* | 1/2009 | Parks | G01L 5/228 438/53 |
| 2014/0130610 | A1* | 5/2014 | O'Keefe | A61B 7/00 73/862.68 |

OTHER PUBLICATIONS

Vlajidi, "Soft Robotics: A Perspective—Current Trends and Prospects for the Future", Soft Robotics, vol. 1, No. 1, pp. 5-11 (2014).
Li et al., "Localization and Manipulation of Small Parts Using GelSight Tactile Sensing", 2014 IEEE/RSJ International conference on Intelligent Robots and Systems (IROS 2014), pp. 3988-3993 (Sep. 2014).
Heyneman et al., "Slip classification for dynamic tactile array sensors", The Intl. J. Of Robotics Research, vol. 35(4), pp. 404-421 (2016).
Dollar et al., "Lower Extremity Exoskeletons and Active Orthoses: Challenges and State-of-the-Art", IEEE Transactions on Robotics, vol. 24, No. 1, pp. 144-158 (Feb. 2008).
Morris et al., "Shoe-Integrated Sensor System for Wireless Gait Analysis and Real-Time Feedback", Proceedings of be Second Joint EMBS/BMES Conference, Houston, TX, vol. 3, pp. 2468-2469 (Oct. 2002).
Liedtke et al., "Evaluation of instrumented shoes for ambulatory assessment of ground reaction forces", Gait & Posture, 26, pp. 39-47 (2007).
Roberts et al., "Testing Pressurized Spacesuit Glove Torque with an Anthropomorphic Robotic Hand", 2012 IEEE International Conf on Robotics and Automation, RiverCentre, St. Paul, Minneosta, pp. 1520-1525 (May 2012).
Nasa, "Next Generation Life Support (NGLS): High Performance EVA Glove (HPEG) Technology Development Element", Active Element, pp. 1-8, printed Aug. 17, 2015 (2011-2016).
Eason et al., "Stress distribution and contact area measurements of a gecko toe using a high-resolution tactile sensor", Bioinspiration & Biomimetics, 10(1), 016013, pp. 1-16 (2015).
Charalambides et al., "A novel all-elastomer Mems tactile sensor for high dynamic range shear and normal force sensing", J. Micromech. Microeng., 25(9), 095009, pp. 1-9 (2015).
Lee et al., "Real-time measurement of the three-axis contact force distribution using a flexible capacitive polymer tactile sensor", J. Micromech. Microeng., 21(3), 035010, pp. 1-9 (2011).
Ma et al., "A flexible tactile and shear sensing array fabricated using a novel buckypaper patterning technique", Sensors and Actuators A: Physical, 231, pp. 21-27 (2015).

Ohmura et al., "Conformable and Scalable Tactile Sensor Skin for Curved Surfaces", Proceedings of the 2006 IEEE Internl. Conf. on Robotics and Automation, Orlando, FL, pp. 1348-1353 (May 2006).
Duchaine et al., "A Flexible Robot Skin for Safe Physical Human Robot Interaction", 2009 IEEE Intl. Conf. on Robotics and Automation, Kobe Intl. Conf. Center, Kobe, JP, pp. 3676-3681 (May 2009).
Cannata et al., "An Embedded Artificial Skin for Humanoid Robots", IEEE Intl. Conf. on Multisensor Fusion and Integration for Intelligent Systems, Seoul, KR, pp. 434-438 (Aug 2008).
Park et al., "Hyperelastic pressure sensing with a liquid-embedded elastomer", J. Micromech. Microeng., 20(12), 125029, pp. 1-6 (2010).
Cheng et al., "A Polymer-Based Capacitive Sensing Array for Normal and Shear Force Measurement", Sensors 2010, 10(11), pp. 10211-10225 (2010).
Pyo et al., "Development of a flexible three-axis tactile sensor based on screen-printed carbon nanotube-polymer composite", J. Micromech. Microeng., 24(7), 075012, pp. 1-9 (Jun. 2014).
Ventrelli et al., "Development of a stretchable skin-like tactile sensor based on polymeric composites", Proceedings of the 2009 IEEE Intnl. Conf. on Robotics and Biomimetics, Guillin, CN, pp. 123-128 (Dec. 2009).
Cai et al., "Super-stretchable, Transparent Carbon Nanotube-Based Capacitive Strain Sensors for Human Motion Detection", Scientific Reports, 3:3048, pp. 1-9 (Oct. 2013).
Gerratt et al., "Elastomeric Electronic Skin for Prosthetic Tactile Sensation", Adv. Fund. Mater., 25(15), pp. 2287-2295 (2015).
Weiss et al., "The Working Principle of Resistive Tactile Sensor Cells", Proceedings of the IEEE Intl. Conf. on Mechatronics & Automation, Niagara Falls, CA, vol. 1, pp. 471-476 (Jul. 2005).
Guber et al., "Microfluidic lab-on-a-chip systems based on polymers—fabrication and application", Chemical Engineering Journal 101(1), pp. 447-453 (2004).
Iwai et al., "Finger-powered microfluidic systems using multilayer soft lithography and injection molding processes", Lab on a Chip, 14(19), pp. 3790-3799 (2014).
Carugo et al., "Facile and cost-effective production of microscale Pdms architectures using a combined micromilling-replica moulding (uMi-REM) technique", Biomed Microdevices, 18(1): 1-10, 4 (Jan. 2016).
Day et al., "Microwedge Machining for the Manufacture of Directional Dry Adhesives", J. Of Micro and Nano-Manufacturing, vol. 1, pp. 1-10 (Mar. 2013).
Duncan et al., "Scaling of pneumatic digital logic circuits", Lab on a Chip, 15(5), pp. 1360-1365 (2015).
Howe, "Tactile Sensing and Control of Robotic Manipulation", Journal of Advanced Robotics, 8(3), pp. 245-261 (1994).
Yu et al., "Mechanical responses of rat vibrissae to airflow", Journal of Experimental Biology, 219(7), pp. 937-948 (Jan. 2016).
Shin et al., "A Soft Microfabricated Capacitive Sensor for High Dynamic Range Strain Sensing", 2016 IEEE/RSJ Intl. Conf. On Intelligent Robots and Systems (IROS), Daejeon Convention Center, Daejeon, KR, pp. 5572-5578 (Oct. 2016).
Eberle et al., "A new twist on gyroscopic sensing: body rotations lead to torsion in flapping, flexing insect wings", J. Royal Society Interface, 12(104): 20141088, 2015.
Hu et al., "Development of patterned carbon nanotubes on a 3D polymer substrate for the flexible tactile sensor application", J. Micromech. Microeng., 21(11), pp. 1-12 (Oct. 2011).

* cited by examiner

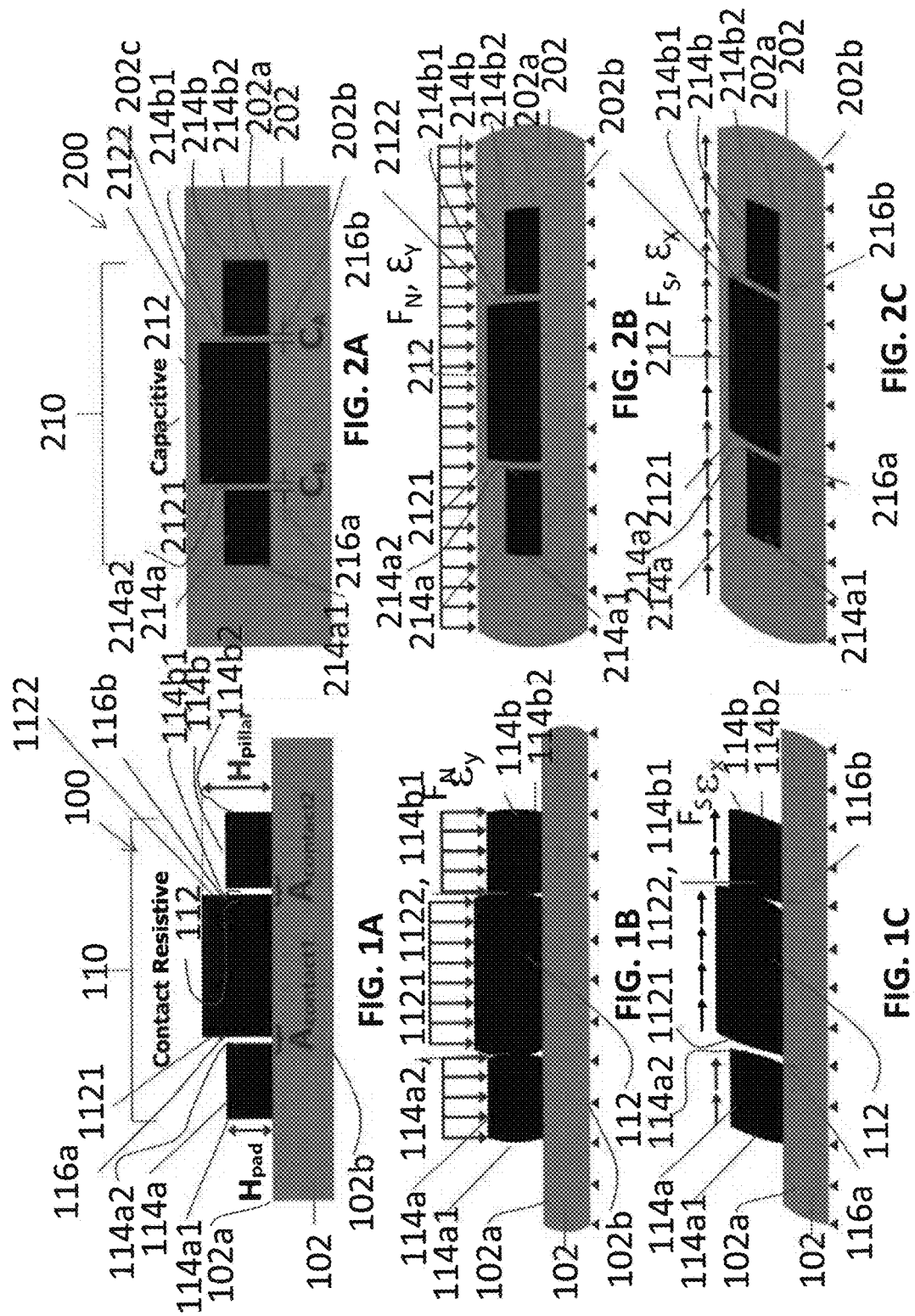

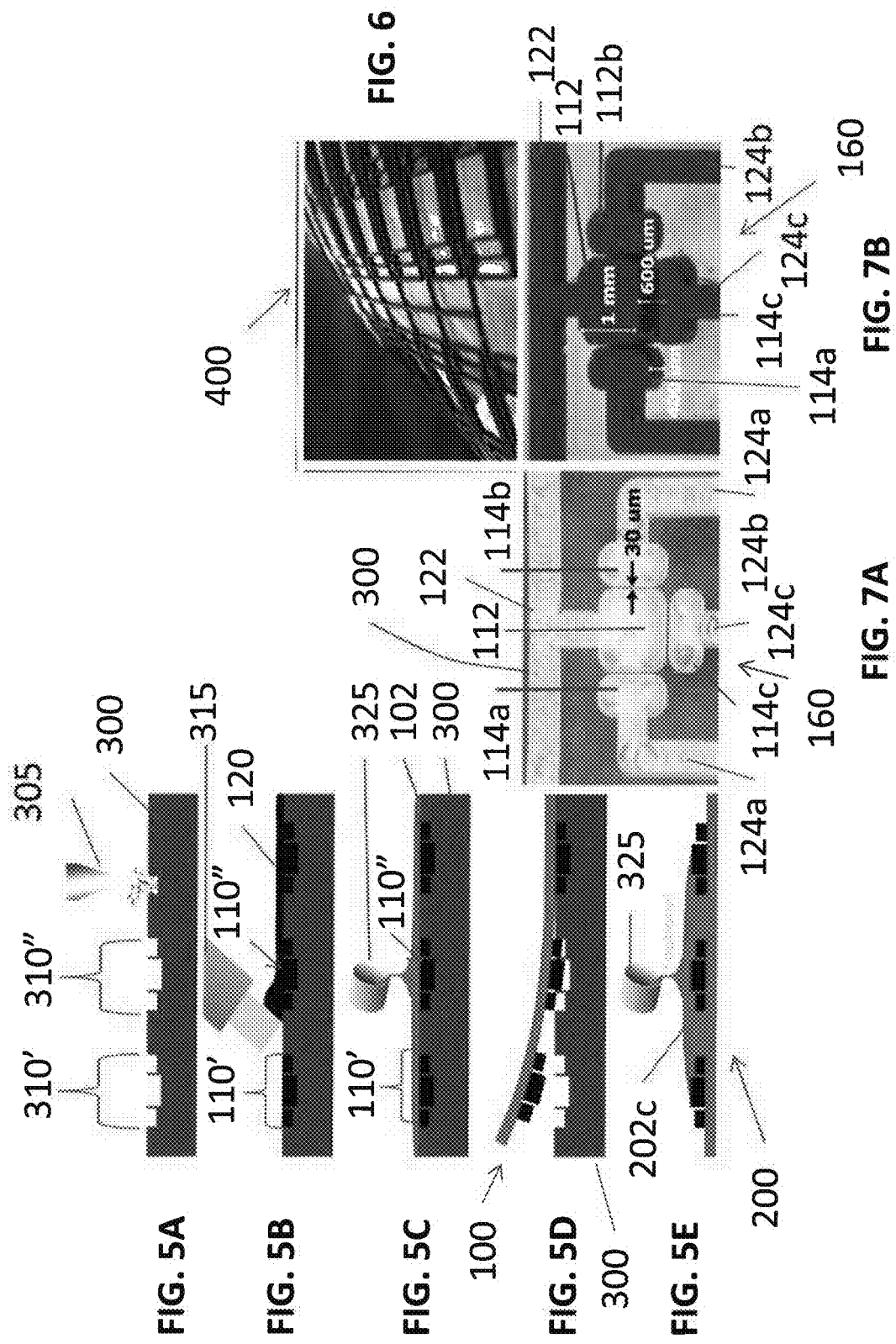

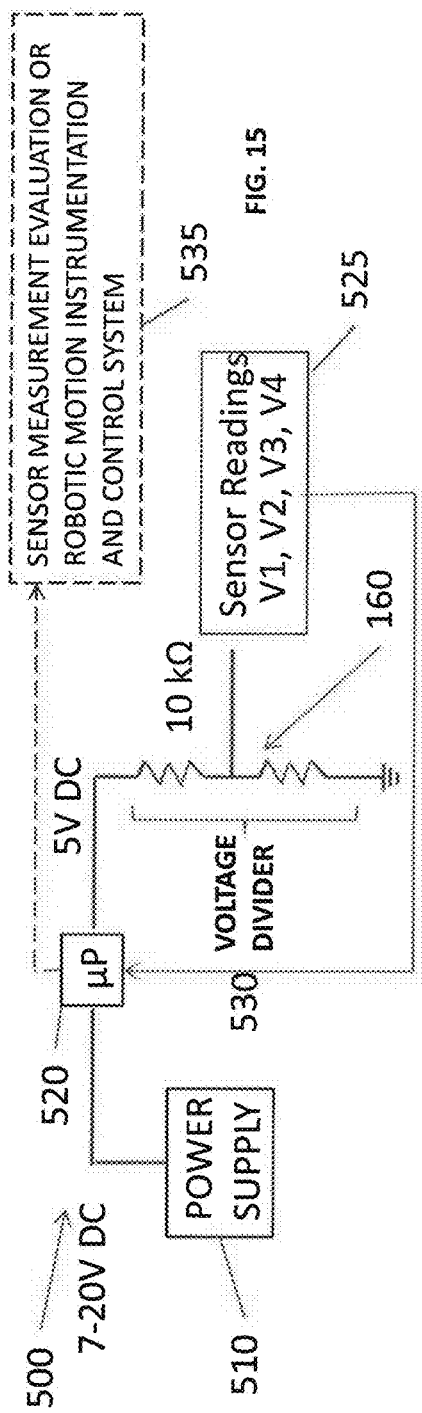
FIG. 15
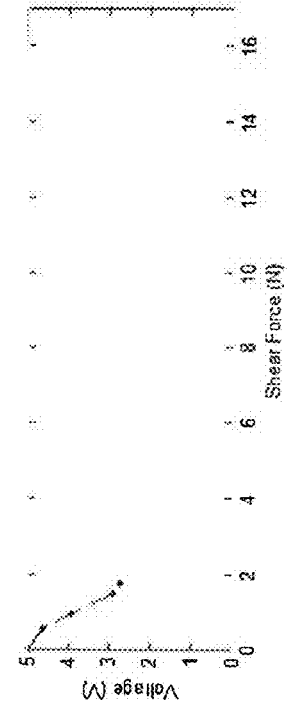
FIG. 16A
FIG. 16B
FROM FIG. 11A
FROM FIG. 11B,
11C OR 11D

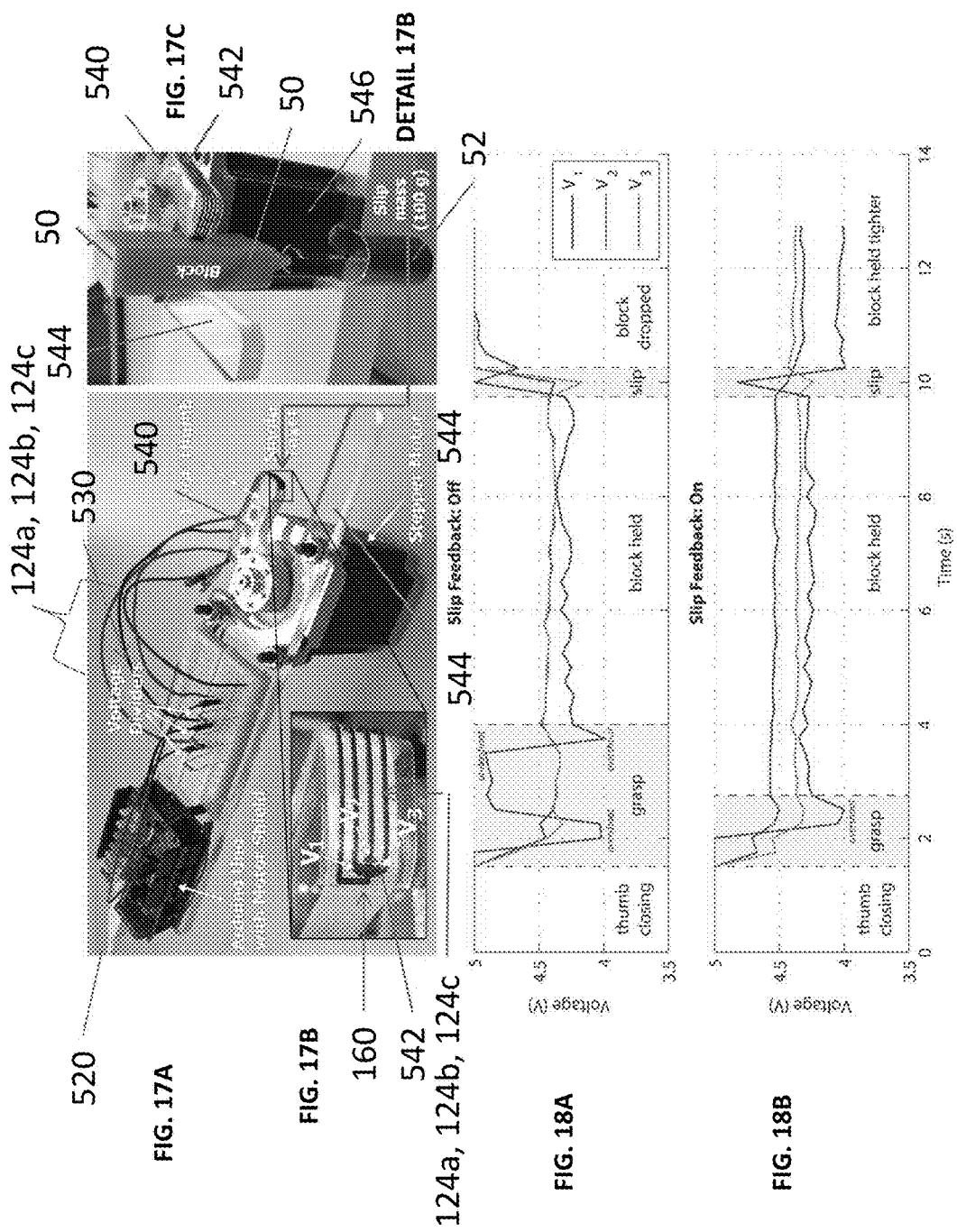

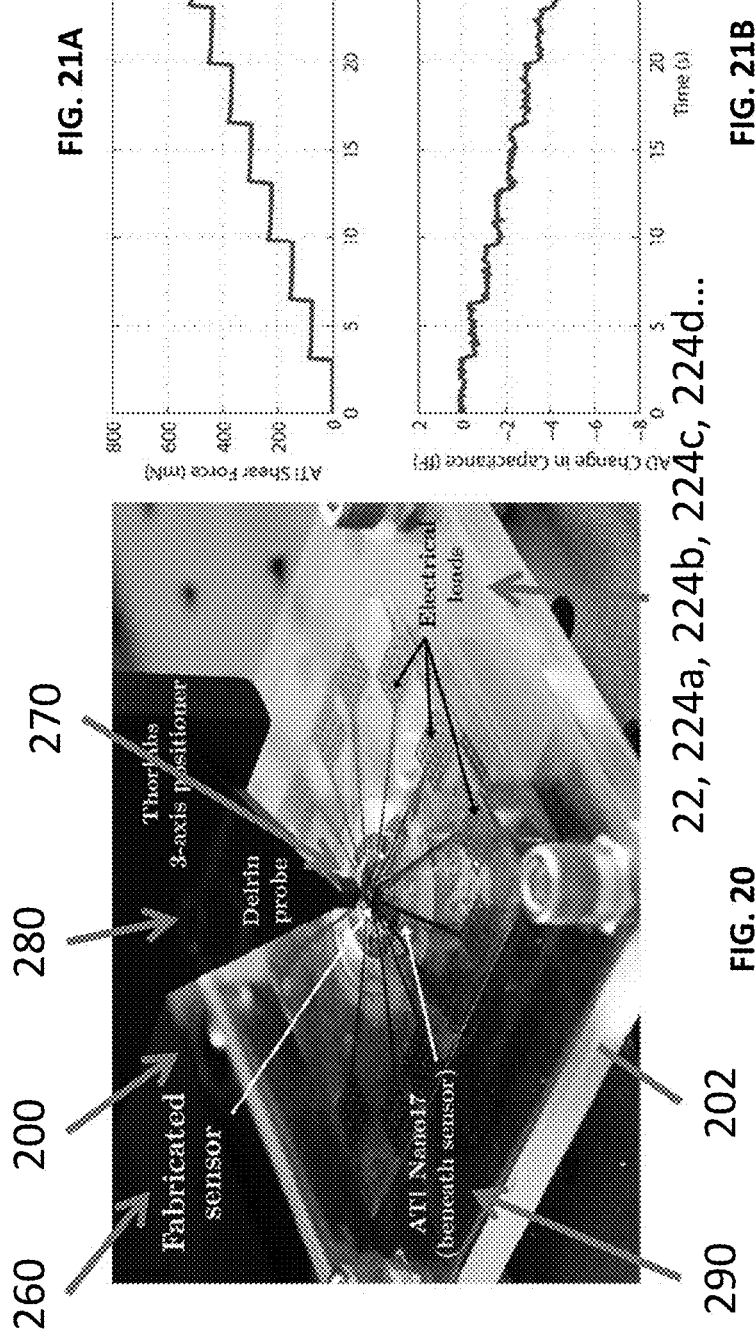

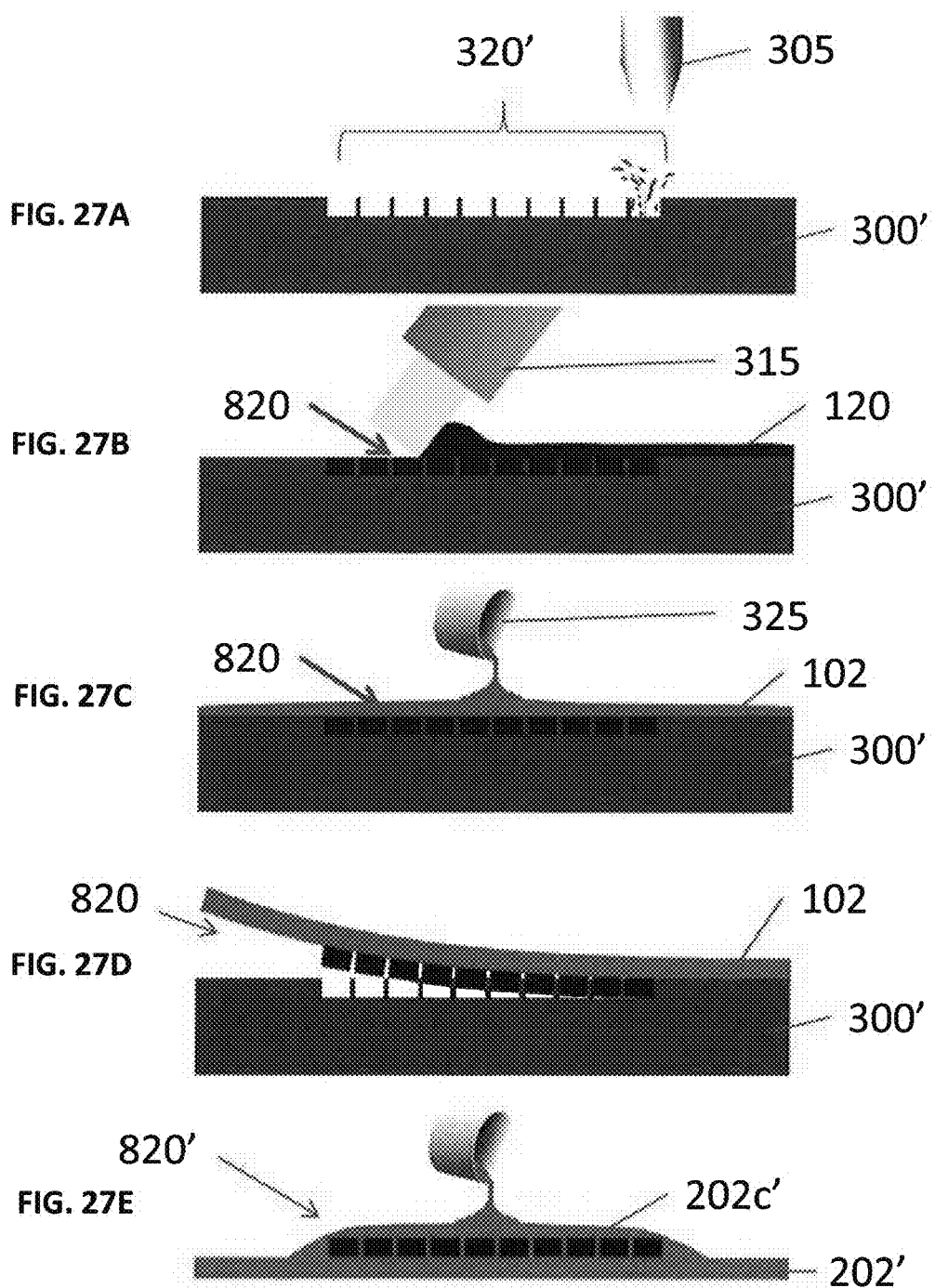

ALL-ELASTOMER 3-AXIS CONTACT RESISTIVE TACTILE SENSOR ARRAYS AND MICROMILLED MANUFACTURING METHODS THEREOF

CROSS-REFERENCE TO RELATED APPLICATIONS

This application claims the benefit of, and priority to, U.S. Provisional Patent Application 62/214,400 filed on Sep. 4, 2015 "All-Elastomer 3-Axis Tactile Sensing Skin," by A. Charalambides and U.S. Provisional Patent Application 62/332,825 filed on May 6, 2016 "Micromilled Manufacturing of All-elastomer 3-axis Contact Resistive Tactile Sensor Arrays," by A. Charalambides et al., the entire contents of both of which are incorporated by reference herein.

STATEMENT OF GOVERNMENT SUPPORT

This invention was made with U.S. government support under NNX12AM02G awarded by NASA. The U.S. government has certain rights in the invention.

BACKGROUND

1. Technical Field

The present disclosure relates to tactile sensors for robotic applications and more particularly to manufacturing processes for and structural design of robotic tactile sensors.

2. Discussion of Related Art

As the field of robotics progresses towards autonomy, advanced tactile sensors are pivotal in enabling safe and dexterous interaction between a robot and its environment [1, 2]. Robotic tasks that generally rely on vision alone, such as grasping, are greatly enhanced with the addition of tactile sensing [3]. Shear force sensing in addition to normal force sensing is especially important in detecting slip of a grasped object [4]. Other wearable systems such as exoskeletons [5], shoes [6, 7], and gloves [8, 9] also stand to benefit from affordable, sensor rich "robot skins" that provide real-time force vectors over a large area. Over the past three decades, notable progress has been made in the field of tactile sensing. Camera-based tactile sensors, in which a soft material is pressed and the deformation is processed visually, have been be to achieve micro-scale spatial resolution but such camera-based tactile sensors are typically limited to a small sensing area and have large, specialized hardware [10]. More compact and versatile sheets of tactile sensor arrays have also been developed [11], and leverage MEMS manufacturing to create micro-scale sensor geometries essential to multi-axis sensing. However, this method typically results in laborious and complicated multilayer assembly with sub newton force ranges [12]. MEMS manufacturing also limits the sensing area to that of a silicon wafer [13]. Other tactile sensors which have large sensing areas have been limited to normal force sensing only [14, 15], or have had limited flexibility [16], micro-fluidic eutectic indium gallium (eGaIn) tactile sensors have achieved remarkable flexibility but are potentially hazardous if ruptured [17]. Therefore, there is a need for a flexible, large area tactile sensor array capable of shear force sensing in addition to normal force sensing. The transduction method also plays an important role in the design and performance of tactile sensors. Flexible tactile sensor arrays typically utilize parallel-plate style capacitors [18], or resistive serpentines or strips to detect applied loads [19]. Elastomer-based piezoresistive sensors tend to suffer from electromechanical hysteresis [20, 21] and capacitive sensors [11, 22] require significant efforts in shielding.

SUMMARY

To address the foregoing disadvantages of the prior art, the present disclosure relates to a rapid manufacturing process and taxel geometry to create the first large area, all-elastomer "robot skin" capable of 3-axis tactile sensing. The milling-based process avoids clean room time while producing features over multiple length scales, from 10 s of microns to 10 s of centimeters, and molds all-elastomer materials to create a mechanically flexible skin. Taxels can detect applied loads using either a contact resistive approach that uses simple circuitry, or a capacitive approach that provides high dynamic range. Using the contact resistive approach, normal force range and resolution were 8 N and 1 N, respectively, and shear force range and resolution were 450 mN and 100 mN, respectively. Using the capacitive approach, normal force range and resolution were 10 N and 100 mN, respectively, and shear force range and resolution were 1500 mN and 50 mN, respectively. A robot skin the size of a human hand was manufactured with 12 taxels, and was capable of detecting normal and shear loads over a large area. Finally, a single contact resistive taxer was integrated into a one degree-of-freedom gripper, and was able to detect and prevent slip of a grasped object.

More particularly, the present disclosure relates to at least one tactile sensor that includes an insulating layer defining a surface and a conductive layer formed on the surface of the insulating layer. The conductive layer defines at least one group of flexible projections extending orthogonally from the surface of the insulating layer. The at least one group of flexible projections includes a major projection extending a distance orthogonally from the surface of the insulating layer and at least one minor projection that is adjacent to and separate from the major projection. The at least one minor projection extends orthogonally a distance from the surface of the insulating layer wherein the major projection extends a distance orthogonally from the surface of the insulating layer that is greater than the distance by which the at least one minor projection extends orthogonally from the surface of the insulating layer.

In embodiments, the at least one group of flexible projections may be configured and disposed on the surface of the insulating layer such that upon being subjected to a compressive force normal to the surface of the insulating layer, the major projection and the at least one minor projection flex such that an electrical contact resistance is formed between the major projection and the at least one minor projection that represents movement caused by the compressive normal force.

In embodiments, the at least one tactile sensor may further include an electrical lead in electrical communication with the major projection and an electrical lead in electrical communication with the at least one minor projection, the electrical leads configured and disposed to enable reading of the electrical contact resistance upon application of an electrical voltage potential between the major projection and the at least one minor projection.

In embodiments, the at least one tactile sensor may define an array of tactile sensors having an area magnitude sufficient to effectuate a robotic skin.

In embodiments, the at least one minor projection includes at least first and second minor projections, wherein the at least one group of flexible projections are configured and disposed on the surface of the insulating layer such that upon being subjected to a shear force parallel to the surface of the insulating layer, the major projection and the first minor projection flex such that an electrical contact resistance is formed between the major projection and the first minor projection that represents movement caused by the shear force.

In embodiments, the at least one tactile sensor may further include an electrical lead in electrical communication with the major projection and an electrical lead in electrical communication with the at least one minor projection wherein the electrical leads are configured and disposed to enable reading of the electrical contact resistance upon application of an electrical voltage potential between the major projection and the at least one minor projection.

In embodiments, the at least one group of flexible projections may be configured and disposed on the surface of the insulating layer such that at least one gap is formed between at least one lateral surface of the major projection and at least one lateral surface of the at least one minor projection, wherein material forming the insulating layer is configured and disposed sufficiently to encapsulate the at least one group of flexible projections such that the material forming the insulating layer fills the at least one gap formed between the at least one lateral surface of the major projection and at least one lateral surface of the at least one minor projection, and wherein the material forming the insulating layer filling the at least one gap formed between the at least one lateral surface of the major projection and at least one lateral surface of the at least one minor projection effects a dielectric presence between the major projection and the at least one minor projection to enable a capacitance reading therebetween.

In embodiments, the at least one tactile sensor may further include an electrical lead in electrical communication with the major projection and an electrical lead in electrical communication with the at least one minor projection, wherein the electrical leads are configured and disposed to enable reading of the capacitance upon application of an electrical voltage potential between the major projection and the at least one minor projection.

The present disclosure relates also to a method of manufacturing at least one tactile sensor that includes providing a molding layer having a mold pattern of trenches defined therein, applying a conductive material to fill the mold pattern of trenches to define at least one conductive layer therein and applying a layer of insulating material to the conductive material filling the mold pattern of trenches. The mold pattern of trenches is formed such that the applying the conductive material defines at least one group of flexible projections including a major projection extending a distance orthogonally from the surface of the insulating layer; and at least one minor projection that is adjacent to and separate from the major projection. The at least one minor projection extends orthogonally a distance from the surface of the insulating layer, wherein the major projection extends a distance orthogonally from the surface of the insulating layer that is greater than the distance by which the at least one minor projection extends orthogonally from the surface of the insulating layer.

In embodiments, the method of manufacturing may further include forming the mold pattern such that the at least one group of flexible projections on the surface of the insulating layer is configured and disposed such that upon being subjected to a compressive force normal to the surface of the insulating layer, the major projection and the at least one minor projection flex such that an electrical contact resistance is formed between the major projection and the at least one minor projection that represents movement caused by the compressive normal force.

In embodiments, the method of manufacturing may further include providing an electrical lead in electrical communication with the major projection and providing an electrical lead in electrical communication with the at least one minor projection such that the electrical leads are configured and disposed to enable reading of the electrical contact resistance upon application of an electrical voltage potential between the major projection and the at least one minor projection.

In embodiments, the method of manufacturing may further include forming the mold pattern such that the at least one tactile sensor defines an array of tactile sensors having an area magnitude sufficient to effectuate a robotic skin.

In embodiments, the method of manufacturing may further include wherein the at least one minor projection includes at least first and second minor projections, the method further includes forming the mold pattern such that the at least one group of flexible projections are configured and disposed on the surface of the insulating layer such that upon being subjected to a shear force parallel to the surface of the insulating layer, the major projection and the first minor projection flex such that an electrical contact resistance is formed between the major projection and the first minor projection that represents movement caused by the shear force.

In embodiments, the method of manufacturing may further include providing an electrical lead in electrical communication with the major projection and an electrical lead in electrical communication with the at least one minor projection such that the electrical leads are configured and disposed to enable reading of the electrical contact resistance upon application of an electrical voltage potential between the major projection and the at least one minor projection.

In embodiments, the method of manufacturing may further include forming the mold pattern such that the at least one tactile sensor defines an array of tactile sensors having an area magnitude sufficient to effectuate a robotic skin.

In embodiments, the method of manufacturing may further include forming the mold pattern such that the at least one group of flexible projections are configured and disposed on the surface of the insulating layer such that at least one gap is formed between at least one lateral surface of the major projection and at least one lateral surface of the at least one minor projection, and filling the at least one gap formed between the at least one lateral surface of the major projection and at least one lateral surface of the at least one minor projection with the material of the insulating layer to effect a dielectric presence between the major projection and the at least one minor projection to enable a capacitance reading therebetween.

In embodiments, the method of manufacturing may further include providing an electrical lead in electrical communication with the major projection and an electrical lead in electrical communication with the at least one minor projection such that the electrical leads are configured and disposed to enable reading of the capacitance upon application of an electrical voltage potential between the major projection and the at least one minor projection.

The present disclosure relates also to a system for measuring a sensed output of at least one tactile sensor that includes at least one tactile sensor and a microprocessor in electrical communication with the at least one tactile sensor. The at least one tactile sensor includes an insulating layer defining a surface and a conductive layer formed on the surface of the insulating layer. The conductive layer defines at least one group of flexible projections extending orthogonally from the surface of the insulating layer. The at least one group of flexible projections includes a major projection extending a distance orthogonally from the surface of the insulating layer and at least one minor projection that is adjacent to and separate from the major projection. The at least one minor projection extends orthogonally a distance from the surface of the insulating layer, wherein the major projection extends a distance orthogonally from the surface of the insulating layer that is greater than the distance by which the at least one minor projection extends orthogonally from the surface of the insulating layer.

In embodiments, the at least one group of flexible projections of the system may be configured and disposed on the surface of the insulating layer such that upon being subjected to a compressive force normal to the surface of the insulating layer, the major projection and the at least one minor projection flex such that an electrical contact resistance is formed between the major projection and the at least one minor projection that represents movement caused by the compressive normal force.

In embodiments, the system may further include an electrical lead in electrical communication with the major projection and an electrical lead in electrical communication with the at least one minor projection. The electrical leads may be configured and disposed to enable reading of the electrical contact resistance upon application of an electrical voltage potential between the major projection and the at least one minor projection.

In embodiments, the system may further include a voltage divider in electrical communication with the microprocessor and with the at least one tactile sensor via the electrical leads configured and disposed to enable reading of the electrical contact resistance upon application of an electrical voltage potential between the major projection and the at least one minor projection.

In embodiments, the reading of the electrical contact resistance is transmitted as feedback to the microprocessor.

In embodiments, the system for measuring a sensed output of at least one tactile sensor may be in electrical communication with one of a sensor measurement evaluation system or a robotic motion instrumentation and control system or combinations thereof, and the reading of the electrical contact resistance is transmitted from the microprocessor to the one of a sensor measurement evaluation system or a robotic motion instrumentation and control system or combinations thereof.

In embodiments, the at least one tactile sensor may define an array of tactile sensors having an area magnitude sufficient to effectuate a robotic skin.

In embodiments, the at least one minor projection of the system may include at least first and second minor projections, wherein the at least one group of flexible projections are configured and disposed on the surface of the insulating layer such that upon being subjected to a shear force parallel to the surface of the insulating layer, the major projection and the first minor projection flex such that an electrical contact resistance is formed between the major projection and the first minor projection that represents movement caused by the shear force.

In embodiments, the system may further include an electrical lead in electrical communication with the major projection and an electrical lead in electrical communication with the at least one minor projection the electrical leads may be configured and disposed to enable reading of the electrical contact resistance upon application of an electrical voltage potential between the major projection and the at least one minor projection.

In embodiments, the system may further include a voltage divider in electrical communication with the microprocessor and with the at least one tactile sensor via the electrical leads configured and disposed to enable reading of the electrical contact resistance upon application of an electrical voltage potential between the major projection and the at least one minor projection.

In embodiments, the reading of the electrical contact resistance is transmitted as feedback to the microprocessor.

In embodiments, wherein the system for measuring a sensed output of at least one tactile sensor is in electrical communication with one of a sensor measurement evaluation system or a robotic motion instrumentation and control system or combinations thereof, and wherein the reading of the electrical contact resistance is transmitted from the microprocessor to the one of a sensor measurement evaluation system or a robotic motion instrumentation and control system or combinations thereof.

In embodiments, the at least one group of flexible projections of the system may be configured and disposed on the surface of the insulating layer such that at least one gap is formed between at least one lateral surface of the major projection and at least one lateral surface of the at least one minor projection, wherein material forming the insulating layer is configured and disposed sufficiently to encapsulate the at least one group of flexible projections such that the material forming the insulating layer fills the at least one gap formed between the at least one lateral surface of the major projection and at least one lateral surface of the at least one minor projection, and wherein the material forming the insulating layer filling the at least one gap formed between the at least one lateral surface of the major projection and at least one lateral surface of the at least one minor projection effects a dielectric presence between the major projection and the at least one minor projection to enable a capacitance reading therebetween.

In embodiments, the system may further include an electrical lead in electrical communication with the major projection and an electrical lead in electrical communication with the at least one minor projection. The electrical leads are configured and disposed to enable reading of the capacitance upon application of an electrical voltage potential between the major projection and the at least one minor projection.

In embodiments, the system may further include a multiplexer in electrical communication with the microprocessor and with the at least one tactile sensor via the electrical leads configured and disposed to enable reading of the capacitance upon application of an electrical voltage potential between the major projection and the at least one minor projection. The reading of the capacitance may be transmitted as feedback to the microprocessor.

In embodiments, the system for measuring a sensed output of at least one tactile sensor may be in electrical communication with one of a sensor measurement evaluation system or a robotic motion instrumentation and control system or combinations thereof, and wherein the reading of the capacitance is transmitted from the microprocessor to the one of a sensor measurement evaluation system or a robotic motion instrumentation and control system or combinations thereof. The at least one tactile sensor defines an array of tactile sensors having an area magnitude sufficient to effectuate a robotic skin.

The system may further include a capacitive-to-digital converter in electrical communication with a multiplexer. The capacitive-to-digital converter and the multiplexer may be in electrical communication with the microprocessor and with the at least one tactile sensor via the electrical leads configured and disposed to enable reading of the capacitance upon application of an electrical voltage potential between the major projection and the at least one minor projection. The reading of the capacitance may be transmitted as feedback to the microprocessor. Again the system may be in electrical communication with one of a sensor measurement evaluation system or a robotic motion instrumentation and control system or combinations thereof, and the reading of the capacitance is transmitted from the microprocessor to the one of a sensor measurement evaluation system or a robotic motion instrumentation and control system or combinations thereof. The at least one tactile sensor may define an array of tactile sensors having an area magnitude sufficient to effectuate a robotic skin.

The present disclosure relates to a composition of matter that includes a mixture of a mass of carbon nanotubes (CNT) and a mass of polydimethylsiloxane (PDMS) wherein the mixture defines a conductive elastomer.

In embodimentsm the mass of polydimethylsiloxane (PDMS) and the mass of carbon nanotubes (CNT) may define a ratio of 10:1 wherein the mixture includes a total weight percent of 7 wt. % carbon nanotubes.

BRIEF DESCRIPTION OF THE DRAWINGS

The patent or application the contains at least one drawing executed in color. Copies of this patent or patent application publication with color drawing(s) will be provided by the Office upon request and payment of the necessary fee.

The above-mentioned advantages and other advantages will become more apparent from the following detailed description of the various exemplary embodiments of the present disclosure with reference to the drawings wherein:

FIG. 1A is a cross-sectional view of a contact resistive tactile sensor in an unstressed condition according to embodiments of the present disclosure;

FIG. 1B is a cross-sectional view of the contact resistive tactile sensor of FIG. 1A when subjected to a compressive normal force;

FIG. 1C is a cross-sectional view of the contact resistive tactile sensor of FIGS. 1A and 1B when subjected to a shear force;

FIG. 2A is a cross-sectional view of a capacitive tactile sensor in an unstressed condition according to embodiments of the present disclosure;

FIG. 2B is a cross-sectional view of the capacitive tactile sensor of FIG. 2A when subjected to a compressive normal force;

FIG. 2C is a cross-sectional view of the capacitive tactile sensor of FIGS. 2A and 2B when subjected to a shear force;

FIG. 5A is a schematic illustration of the step of milling a mold to define a pattern of trenches to enable defining an array of groups of flexible projections to manufacture the contact resistive or capacitive tactile sensors shown in FIGS. 1A-1C and FIGS. 2A-2C;

FIG. 5B is a schematic illustration of the step of applying a conductive material to fill the mold pattern of trenches of FIG. 5A;

FIG. 5C is a schematic illustration of the step of applying a layer of insulating material to the conductive material filling the mold pattern of trenches of FIG. 5B;

FIG. 5D is a schematic illustration of the step of peeling the contact resistive tactile sensor of FIGS. 1A-1C or an uncompleted capacitive tactile sensor of FIGS. 2A-2C from the mold of FIG. 5C;

FIG. 5E is a schematic illustration of the step of filling gaps between pillars and pads with an insulating material forming the mold of FIGS. 5A-5D;

FIG. 6 is an isometric view of a robotic skin manufactured according to the method steps of FIG. 5A-5D or 5A-5E;

FIG. 7A illustrates a close-up view of a contact resistive tactile sensor that has been manufactured according to the steps illustrated in FIGS. 5A-5D;

FIG. 7B is a close-up view of the contact resistive tactile sensor of FIG. 7A with the mold removed;

FIG. 11A1 illustrates a plot of voltage versus normal force for a contact resistive tactile sensor as illustrated in FIG. 11A;

FIG. 11A2 illustrates a plot of capacitance versus normal force for a capacitive tactile sensor as illustrated in FIG. 11A;

FIG. 11B1 illustrates a plot of voltage versus shear force for a contact resistive tactile sensor as illustrated in FIG. 11B;

FIG. 11B2 illustrates a plot of capacitance versus shear force for a capacitive tactile sensor as illustrated in FIG. 11B;

FIG. 11C1 illustrates a plot of voltage versus shear force for a contact resistive tactile sensor as illustrated in FIG. 11C;

FIG. 11C2 illustrates a plot of capacitance versus shear force for a capacitive tactile sensor as illustrated in FIG. 11C;

FIG. 11D1 illustrates a plot of voltage versus shear force for a contact resistive tactile sensor as illustrated in FIG. 11D;

FIG. 11D2 illustrates a plot of capacitance versus shear force for a capacitive tactile sensor as illustrated in FIG. 11D;

FIG. 11E1 illustrates a plot of voltage versus cyclic shear force for the contact resistive tactile sensor as illustrated in FIG. 11E;

FIG. 12A illustrates a graphical plot of change of voltage versus position for the robot skin of FIG. 12 when subject to a normal force in the direction of the tip of the middle finger;

FIG. 12B illustrates a graphical plot of change of voltage versus position for the robot skin of FIG. 12 when subject to an upward shear force in the direction of the palm area;

FIG. 15 illustrates a schematic diagram for a system for measuring a sensed output of at least one contact resistive tactile sensor such as the contact resistive tactile sensor illustrated in FIGS. 1A-1C and FIGS. 7A-7B according to embodiments of the present disclosure;

FIG. 16A illustrates a typical set of sensor readings of voltage versus normal force $F_N$ (in N) for a contact resistive tactile sensor according to embodiments of the present disclosure such as illustrated in FIG. 11A;

FIG. 16B illustrates a typical set of sensor reading of voltage versus shear force $F_S$ (in N) for a contact resistive tactile sensor according to embodiments of the present disclosure such as illustrated in FIG. 11A-11D or 11E;

FIG. 17A illustrates a one-degree-of-freedom gripper equipped with a single contact resistive tactile sensor according to embodiments of the present disclosure and a microprocessor and voltage divider for control and measurement;

FIG. 17B illustrates the single contact resistive taxel or tactile sensor mounted onto the tip of a movable robotic "thumb" of the one-degree-of-freedom gripper of FIG. 17A;

FIG. 17C illustrates a test object and a slip mass grasped by the one-degree-of-freedom gripper of FIGS. 17A-17B;

FIG. 18A illustrates test results for the one-degree-of-freedom gripper and the contact resistive tactile sensor of FIGS. 17A-17C with slip feedback OFF;

FIG. 18B illustrates test results for the one-degree-of-freedom gripper and the contact resistive tactile sensor of FIGS. 17A-17C with slip feedback ON;

FIG. 20 illustrates an assembled test setup for a capacitive tactile sensor fabricated within an insulating layer according to embodiments of the present disclosure such as illustrated in FIGS. 2A-2C and FIGS. 11A-11D;

FIG. 21A illustrates the shear force from the force and torque sensor of the test setup of FIG. 20 versus time for the capacitive tactile sensor exhibits a step-like behavior when subject to incremental displacements;

FIG. 21B illustrates the change in capacitance versus time as measured from the evaluation board of the test setup of FIG. 20 that is represented by the microprocessor of the system in FIG. 19;

FIG. 27A is a schematic illustration of the step of milling a mold to define a pattern of trenches to enable defining an array of groups of flexible projections to manufacture the interdigitated electrodes of the flexible strain gauge shown in FIGS. 24 and 26;

FIG. 27B is a schematic illustration of the step of applying a conductive material to fill the mold pattern of trenches of FIG. 27A;

FIG. 27C is a schematic illustration of the step of applying a layer of insulating material to the conductive material filling the mold pattern of trenches of FIG. 27B;

FIG. 27D is a schematic illustration of the step of peeling the contact resistive tactile sensor in the form of interdigitated electrodes of the flexible strain gauge of FIGS. 24 and 26 or an uncompleted capacitive tactile sensor in the form of interdigitated electrodes of the flexible strain gauge of FIGS. 24 and 26 from the mold of FIG. 27C; and FIG. 27E is a schematic illustration of the step of filling gaps between pillars and pads with an insulating material forming the mold of FIGS. 27A-27D to complete formation of a capacitive tactile sensor in the form of interdigitated electrodes of the flexible strain gauge of FIGS. 24 and 26.

DETAILED DESCRIPTION

Figures 3, 4:
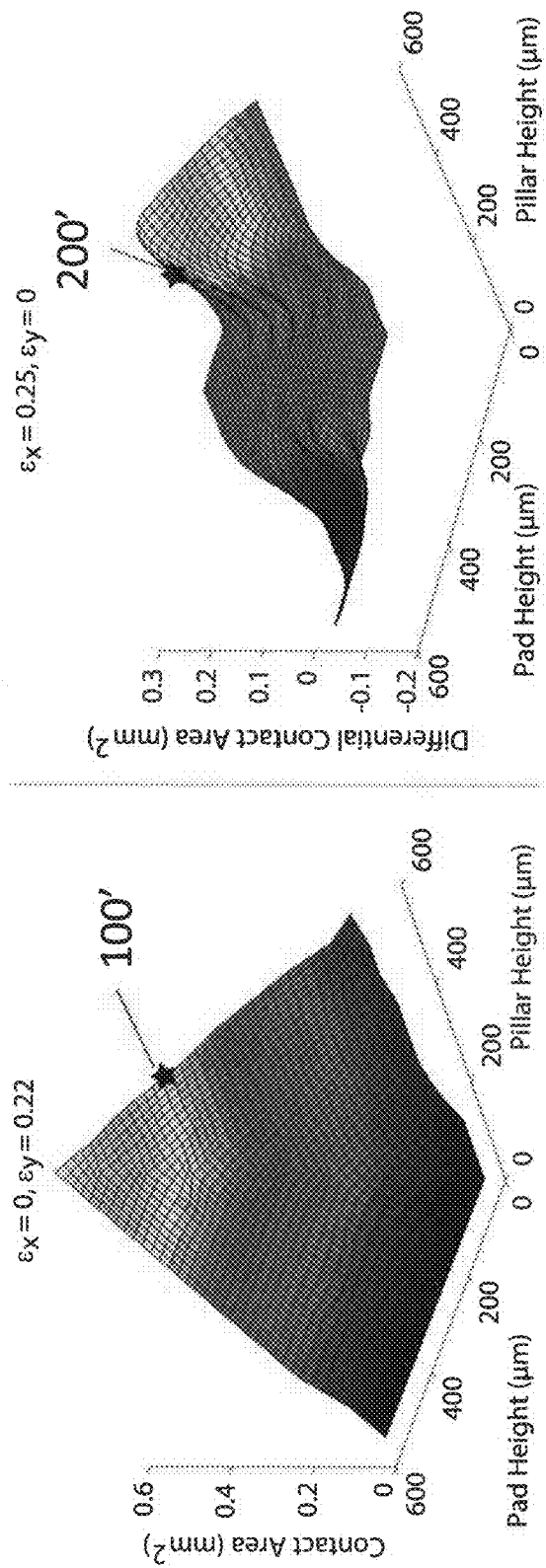
FIG. 3 is a graphical plot of the results of a parametric study of a contact resistive tactile sensor according to FIGS. 1A-1C using finite element analysis wherein normal displacements are applied according to FIG. 1B and contact area is shown as a function of pillar and pad heights.
FIG. 4 is a graphical plot of the results of a parametric study of a contact resistive tactile sensor according to FIGS. 1A-1C using finite element analysis wherein shear displacements are applied according to FIG. 1C and contact area is shown as a function of pillar and pad heights.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants, and other devices that facilitate communication of information between end-users within a network.

The general features and aspects of the present disclosure remain generally consistent regardless of the particular purpose. Further, the features and aspects of the present disclosure may be implemented in system in any suitable fashion, e.g., via the hardware and software configuration of system or using any other suitable software, firmware, and/or hardware. For instance, when implemented via executable instructions, such as the set of instructions, various elements of the present disclosure are in essence the code defining the operations of such various elements. The executable instructions or code may be obtained from a computer-readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

1—Introduction

This work demonstrates a rapid manufacturing process and taxel geometry to create the first large area, all-elastomer "robot skin" capable of 3-axis tactile sensing. The milling-based process avoids clean room time while producing features over multiple length scales, from 10 s of microns to 10 s of centimeters, and molds all-elastomer materials to create a mechanically flexible skin. Taxels can detect applied loads using either a contact resistive approach that uses simple circuitry, or a capacitive approach that provides high dynamic range.

According to embodiments of the present disclosure, tactile sensors are disclosed that provide significant, non-obvious advantages to overcome the foregoing drawbacks of the prior art.

More particularly, sensor design according to embodiments of the present disclosure can support multiple transduction methods to trade or performance metrics for simplicity in integration. For example, a prosthetic sensor interface may not require the same dynamic range as a robotic manipulation application.

In this work, an all-elastomer large area robot skin capable of shear and normal force sensing was developed.

2—Tactile Sensor Design

Two sensing modalities are presented according to embodiments of the present disclosure: a contact resistive approach to simplify electronics and minimize electromechanical hysteresis, and a high dynamic range capacitive approach based on prior work [11], wherein FIGS. 1A-1C illustrate a cross-sectional view of the sensor architecture for the contact resistive approach while FIGS. 2A-2C illustrate a cross-sectional view of the sensor architecture for the capacitive sensor approach. A contact resistive sensing technique was developed in which two conductive features, referred to as the "pillar" and "pad", come into physical contact as loads are applied. As a compressive normal force is applied, the pillar and pads flatten and expand through Poisson's effect, and come into contact causing a uniform decrease in contact resistance on each side. Meanwhile, a shear force results in a differential contact resistance; contact resistance decreases in the direction of shear and increases on the opposite side. In the capacitive sensing approach, the sensor is encapsulated with a dielectric to form a capacitor between the pillar and pad. As a normal force is applied, the sensor flattens and expands through Poisson's effect, the capacitor gap increases, and the capacitance decreases on each side uniformly. Meanwhile, a shear force results in an increase in capacitance in the direction of loading, and a decrease in capacitance on the opposite side.

Elastomers such as polydimethylsiloxane (PDMS) are especially favorable for these architectures since they are incompressible (Poissons ratio near 0.5), which maximizes lateral expansion under normal deformation. The contact resistive approach differs from previous contact resistive work [23] in that the sensor circuit is open in the unloaded state and becomes dosed as forces are applied, rather than being continuously closed.

Insulating layer 102 in FIGS. 1A-1C and insulating layer 202 in FIGS. 2A-2C are made from a suitable material such as PDMS, and a conductive layer defining a group of flexible projections 110 in FIGS. 1A-1C and a conductive layer defining at least one group of flexible projections 210 in FIGS. 2A-2C are made from a conductive-PDMS.

It can be appreciated then that with respect to the contact resistive tactile sensor 100, the conductive layer in FIGS. 1A-1C defines at least one group 110 of flexible projections that includes a major flexible projection 112 that extends orthogonally a distance $H_{pillar}$ orthogonally from surface 102a of the insulating layer 102 and at least one minor flexible projection 114a, and may generally include at least a second minor flexible projection 114b, that extends orthogonally a distance $H_{pad}$ from surface 102a. Insulating layer 102 further includes a base surface 102b opposite to surface 102a.

The distance $H_{pillar}$ by which major projection 112 extends orthogonally from the surface 102a of the insulating layer 102 is greater than the distance $H_{pad}$ by which the minor projections 114a and 114b extend orthogonally from the surface 102a of the insulating substrate.

As defined herein, the term major projection relates merely to the distance $H_{pillar}$ characterizing the major projection 112 being greater than the distance $H_{pad}$ characterizing the minor projections 114a and 114b and does not relate to any difference in importance of the major projection 112 with respect to the minor projections 114a and 114b.

Additionally, the term taxel may be used and as defined herein refers to a tactile sensor as such terminology is commonly applied in the field of robotics.

In the embodiment of a contact resistive tactile sensor 100 illustrated in FIGS. 1A-1C, as forces are applied, the "pillar" or major flexible projection 112, having a first lateral side 1121 and a second lateral side 1122, and "pads" or minor flexible projection 114a, having a first lateral side 114a1 and a second lateral side 114a2, and minor flexible projection 114b, having a first lateral side 114b1 and a second lateral side 114b2, come into physical contact with one another and cause a measurable change in contact resistance, wherein in FIG. 1A, the initial contact resistance between the major flexible projection 112 and the minor flexible projection 114a, which are not then in physical contact, and are separated by a gap 116a that is formed between first lateral side 1121 of major projection 112 and second lateral side 114a2 of minor projection 114, is illustrated as $A_{contact1}$, while the initial contact resistance between the major flexible projection 112 and the minor flexible projection 114b, which are also not then in physical contact, and are separated by a gap 116b that is formed between second lateral side 1122 of major projection 112 and first lateral side 114b1 of minor projection 114b, is illustrated as contact2. In FIG. 1B, as a compressive normal force $F_N$ is applied, inducing strain $\in_y$, the pillar or major flexible projection 112 and the pads 114a and 114b flex and come into contact, i.e., therefore reducing the gaps 116a and 116b, respectively, to cause a uniform decrease in contact resistance $A_{contact}$ on each side, e.g., an electrical contact resistance is formed that represents movement caused by the compressive normal force. {Since the contact resistance $A_{contact}$ is proportional to 1/(contact area), the initial contact resistance $A_{contact}$ is infinity because the contact area is zero initially. A maximum voltage reference reading is established as an unstressed condition between the major projection 112 and the at least second projection 114b. More particularly, as illustrated and described in FIG. 15 below, a voltage divider circuit is open to generate a maximum voltage reference reading of 5 Volts as an unstressed condition between the major projection and the unstressed condition between the major projection 112 and the second projection 114b. As contact resistance $A_{contact}$ decreases with increase in contact area, a change or decrease in voltage is observed and measured}.

In FIG. 1C, as a shear force $F_S$ is applied, contact resistance $A_{contact}$ decreases in the direction of shear strain $\in_x$ (wherein shear stress is commonly referred to as τ), i.e., between major flexible projection 112 and minor flexible projection 114b by closure of gap 116b, and increases on the opposite side, i.e., between major flexible projection 112 and minor flexible projection 114a by maintenance or expansion of gap 116a and between flexible major projection 112 and minor flexible projection 114b by closure of gap 116b. {In a similar manner as described above with respect to the compressive normal force, an electrical contact resistance is formed between the major projection 112 and the at least one minor projection 114a that represents movement caused by the shear force}.

In the capacitive tactile sensor 200 illustrated in FIG. 2A, an additional portion 202c of insulating layer 202 made from a suitable material such as PDMS, and which also forms the insulating layer 202, is used to encapsulate the sensing elements, now wherein the major flexible projection is designated as major projection 212, having a first lateral side 2121 and a second lateral side 2122, and the minor flexible projections are designated as minor projection 214a, having a first lateral side 214a1 and a second lateral side 214a2, and minor projection 214b, having a first lateral side 214b1 and a second lateral side 214b2, for capacitive sensing [11].

In a similar manner as above, it can be appreciated that with respect to the capacitive tactile sensor 200, the conductive layer in FIGS. 2A-2C defines at least one group 210 of flexible projections that includes a major flexible projection 212 that extends orthogonally a distance $H_{pillar}$ orthogonally from surface 202a of the insulating layer 202 and at least one minor flexible projection 214a, and may generally include at least a second minor flexible projection 214b, that extends orthogonally a distance $H_{pad}$ from surface 202a.

Similarly, the distance $H_{pillar}$ by which major projection 212 extends orthogonally from the surface 202a of the insulating layer 202 is greater than the distance $H_{pad}$ by which the minor projections 214a and 214b extend orthogonally from the surface 202a of the insulating substrate.

As defined herein, again, the term major projection relates merely to the distance $H_{pillar}$ characterizing the major projection 212 being greater than the distance $H_{pad}$ characterizing the minor projections 214a and 214b and does not relate to any difference in importance of the major projection 212 with respect to the minor projections 214a and 214b.

In FIG. 2B, as a normal force $F_N$ is applied, inducing strain $\in_y$, the pillar or major flexible projection 212 and the pads 214a and 214b flex by flattening and expand through Poisson's effect causing a uniform decrease in capacitance from initial capacitance $C_B$ between first minor projection 214a and major projection 212 and a uniform decrease in capacitance from initial capacitance $C_A$ between second minor projection 214b and major projection 212.

As a shear force $F_S$ is applied, capacitance $C_A$ increases in the direction of shear $\in_x$ (also commonly referred to as τ), i.e., between major flexible projection 212 and minor flexible projection 214b by reduction of gap 216b, and decreases on the opposite side, i.e., between major flexible projection 212 and minor flexible projection 214a by expansion of gap 216a.

The construction of the capacitive tactile sensor 200 is substantially the same as that of the contact resistive tactile sensor 100 except gap 216a between major projection 212 and minor projection 214a and gap 216b between major projection 212 and minor projection 214b do not vary to the extent that the gaps 116a and 116b for contact resistance sensor 100 in FIGS. 1A-1C vary due to the presence therein of the material forming the additional insulating layer 202c that effects a dielectric presence between the major projection 212 and minor projection 214a and between the major projection 212 and minor projection 214b.

3—Finite Element Modeling

FIG. 3 illustrates the results of a parametric study of the geometry for the contact resistive tactile sensor 100 using finite element analysis for application of normal displacements.

FIG. 4 illustrates the results of a parametric study of the geometry for the contact resistive tactile sensor 100 using finite element analysis for application of shear displacements.

Contact area, i.e., the area when the second lateral side 114a2 of minor projection 114a and the first lateral side 1121 of major projection 112 are in contact and the area when the first lateral side 114b1 of minor projection 114b and the second lateral side 1122 of major projection 112 are in contact is shown as a function of pillar heights $H_{pillar}$ and pad heights $H_{pad}$.

In FIG. 3, the black star 100' is the selected geometry for the application of normal displacements.

In FIG. 4, the black star 200' is the selected geometry for the application of shear displacements. In the case of shear, differential contact area is plotted and is defined as Acontact2–Acontact1.

More particularly, a 2D nonlinear, large deformation finite element model was written in ANSYS Mechanical APDL 14.5 to evaluate the effects of sensor geometry on contact area between the pillar and pads when subject to shear and normal deformation modes. As contact area increases the contact resistance decreases; therefore, a sensor architecture that maximizes contact area under normal deformation while maximizing differential contact area under shear deformation was desired (where differential contact area was defined as Acontact2−Acontact1, (see FIGS. 1A-1C).

In the study, the heights of the pillar, Hpillar, and pads, Hpad, were varied from 60 µm to 600 µm. See FIGS. 3 and 4. Preliminary simulations showed that the smallest gap between the pillar and pads enabled the highest contact area.

Therefore, the smallest gap that could be reliably fabricated was selected, which was 30 µm (20 µm and 10 µm gaps were also producible but with lower yield). A fixed boundary condition was applied to the bottom edge in both normal and shear simulations. Normal and shear displacements were applied on top of the pillar and pads, and were proportional to the total thickness of the sensor. In essence, this created a strain-controlled boundary condition, and was an important technique in normalizing the data because the total thickness of the sensor varied between simulations. In normal simulations, a displacement was applied that resulted in a net normal strain, $\in_y$, of 0.22, while in shear simulations a displacement was applied that resulted in a net shear strain, Ex, of 0.25. A linear-elastic material model based on prior work [11] was used for the PDMS and conductive-PDMS with moduli of 1 MPa and 1.5 MPa, respectively, and both with a Poisson's ratio of 0.49.

Two competing phenomenon were observed. In normal displacement simulations, contact area increased as both the pillar and pad heights increased and was maximal when they were equal. Meanwhile in shear displacement simulations, when the heights were equal a differential contact area of zero was observed due to both pads being in contact with the pillar equally. A maximum was observed at Hpillar=600 µm and Hpad=300 µm. Therefore, a geometry that was selected as a compromise between normal and shear force sensing as represented by the black stars 100' and 200': Hpillar=600 µm and Hpad=400 µm.

4—Manufacturing

Computerized numerical control (CNC) milling and micromachining has been widely used to fabricate lab-on-a-chip devices [24, 25], PDMS microstructures and adhesives [26, 27], and even pneumatic logic circuits [28].

FIGS. 5A-5D illustrate sequential steps in manufacturing either contact resistance tactile sensor 100 or capacitive tactile sensor 200.

FIG. 5E illustrates an additional step of applying an additional quantity of the material forming the insulating layer 202 to form an additional portion 202c of the insulating layer to encapsulate the capacitive tactile sensor 200 for capacitive sensing.

More particularly, FIG. 5A illustrates a mold 300 being milled by a mill 305 to define a pattern of trenches 310', 310", etc. in the mold 300. The mold 300 may be made from a transparent material such as acrylic.

FIG. 5B illustrates an instrument 315 such as a blade or brush that applies a conductive material 120 such as CNT/PDMS to fill the pattern of trenches 310', 310", etc. with the conductive material 120 to form at least one group of flexible projections 110', 110" in the respective trenches 310', 310", etc. The gaps 116a and 116b illustrated in FIGS. 1A-1C for contact resistive tactile sensor 100 and gaps 216a and 216b for capacitive tactile sensor 200 are also formed by the pattern of trenches 310', 310", etc. in the mold 300.

FIG. 5C illustrates material forming the insulating layer 102 being poured from a vessel 325 to form the insulating layer 102 from which the groups of flexible projections 110', 110", etc. project orthogonally as described above with respect to FIGS. 1A-1C, or analogously to form the insulating layer 202 from which the groups of flexible projections 210 project orthogonally as described above with respect to FIGS. 2A-2C.

FIG. 5D illustrates the completed contact resistive tactile sensor 100 (or alternatively an incomplete capacitive tactile sensor 200) being separated or peeled from the mold 300.

In conjunction with FIGS. 2A-2C, FIG. 5E illustrates the completion of capacitive tactile sensor 200 by filling the gaps 216a and 216b with the additional portion 202c of the insulating layer to encapsulate the capacitive tactile sensor 200 for capacitive sensing.

FIG. 6 is an isometric view of robotic skin 400 that has been manufactured according to the steps described above with respect to FIGS. 5A-5D and optionally FIG. 5E.

FIG. 7A illustrates a close-up view of a contact resistive tactile sensor 160 that has been manufactured according to the steps described above. The view is transparent through mold 300 that is made from acrylic. In addition to first minor projection 114a and second minor projection 114b, the tactile sensor 160 further includes a third minor projection 114c that is positioned on a third lateral side of major projection 112 at 90° with respect to both the first minor projection 114a and with respect to the second minor projection 114b. The tactile sensor 160 also further includes electrical leads 124a, 124b and 124c that have been formed in electrical communication with the respective minor projections 114a, 114b, 114c and an electrical lead 122 that has been formed in electrical communication with the major projection 112.

FIG. 7B is a close-up view of the contact resistive tactile sensor 160 of FIG. 7A with the acrylic mold 300 removed.

Figure 8:
FIG. 8 is a perspective view of a completed robotic skin being peeled from the mold.

FIG. 8 is a perspective view of a completed robotic skin 400 being peeled or separated from mold 300 wherein the robotic skin 400 is designed for application to a torso rather than to a hand or arm.

Figure 9:
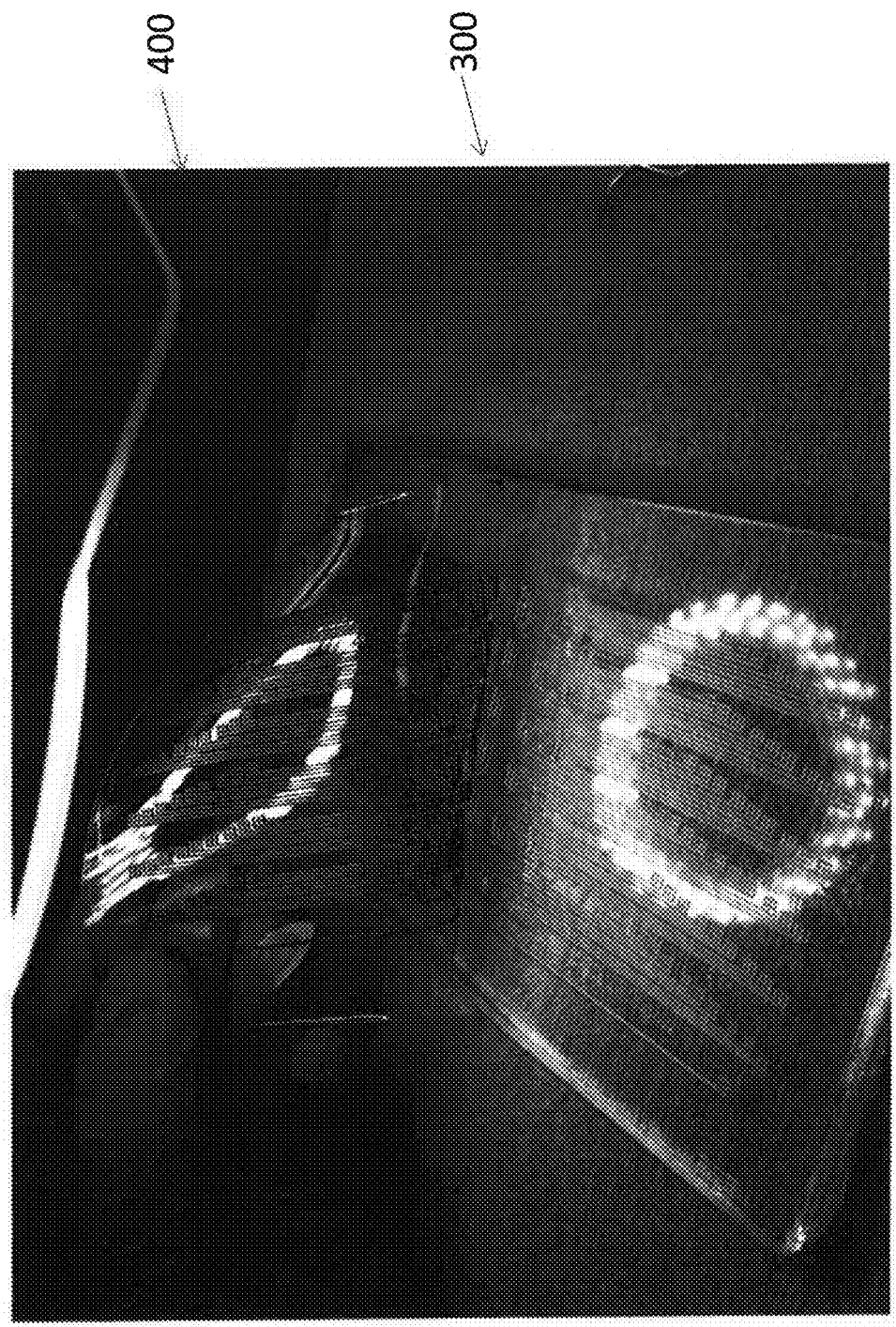
FIG. 9 is another perspective view of the completed robotic skin of FIG. 8 being peeled from the mold.

FIG. 9 is another perspective view of the completed robotic skin 400 being peeled or separated from mold 300.

A milling process to cast a conductive elastomer was developed to achieve microscale features over a large area. See FIGS. 8 and 9. This was preferred to clean room fabrication from prior work [11] due to the larger available workspace and significantly reduced time and costs required for fabrication. For example, clean room work requires the outsourcing of masks for photolithography, expensive machines and chemicals, and many hours of processing time by a highly trained individual all while being limited to the working area/volume of a silicon wafer. Meanwhile, a design cycle with the developed manufacturing process takes less than 12 hours to go from concept to in-hand and ready for testing without sacrificing microscale features. Milling has the added benefit of producing highly vertical sidewalls even in tall features (greater than 400 µm), which is difficult to achieve with clean room techniques such as deep reactive ion etching (DRIE).

A stock of acrylic (McMaster-Carr, 8560K355) was milled in a Roland MDX-540SA desktop mill, with a workspace of approximately 12 in by 16 in, using a 406 µm diameter endmill (Microcut USA, 82016). NC instructions were coded in Tool Path Language, and generated using CAMotics 1.0.0. No rough cutting for planarizing purposes was necessary as seen in other work [28]; the stock was sufficiently planar as received. Instead, it was mounted in the CNC machine and leveled by a manual procedure: trenches of varying depths, 0 µm, 100 µm, 200 µm, and 300 µm deep, were milled in the four corners of the stock followed by minor adjustments until each corner exhibited three trenches. The stock was cut at 10 mm/min at 8000 rpm in taxel areas, and 80 mm/min at 10,000 rpm elsewhere, and finished in approximately 2-3 hours. In the presented design, this method produced features that were 400 µm and 600 µm deep, had a minimum size of 30 µm, and create an array of 6 by 6 taxels spaced every 1 cm. The total area of the mold was 7 in by 4 in.

The mold was refilled with a conductive elastomer. Carbon nanotubes (CNT) (Cheap Tubes, 030103) and 10:1 PDMS (Dow Corning, Sylgard 184) were mixed at a total weight percent of 7 wt. % carbon nanotubes in a centrifugal mixer (Thinky, ARE-310) at 2000 rpm for 190 sec. CNTs were found to be favorable over spherical particles, such as carbon black and silver nanopowder, and exhibited excellent mechanical and electrical properties in PDMS with high yield. Particles such as silver nanowires were too cost prohibitive and were not explored. After mixing, the resulting tarlike CNT/PDMS composite was spread over the mold and planarized using a screen printing squeegee (Ryonet). The mold was placed in an oven at 80° C., a temperature low enough to avoid thermal warping of the acrylic (i.e., below the glass transition temperature), for 30 min to partially cure the CNT/PDMS. After allowing to cool, 10:1 PDMS was poured over the mold and placed in vacuum for 20 min to remove air bubbles, then cured in an oven at 80° C. for 90 min. Lastly, the entire robot skin was peeled from the mold, which can be reused, further saving time and money. For capacitive sensing, additional PDMS is poured over the skin, vacuumed, and cured to encapsulate the taxels in a dielectric.

Each taxel consisted of one pillar and three adjacent pads, with gaps of 30 µm between the pillar and pads. Four pads could not be accommodated due to the space requirements of the electrical routing to the pillar using the 406 µm endmill. The total contact resistive robot skin thickness was 980 µm, with a PDMS layer thickness of approximately 380 µm.

As indicated above, FIGS. 8 and 9 are perspective views illustrating a completed robot skin 400 being peeled from a acrylic mold 300.

5—Robot Skin Characterization 5.1 Test Setup

Figure 10:
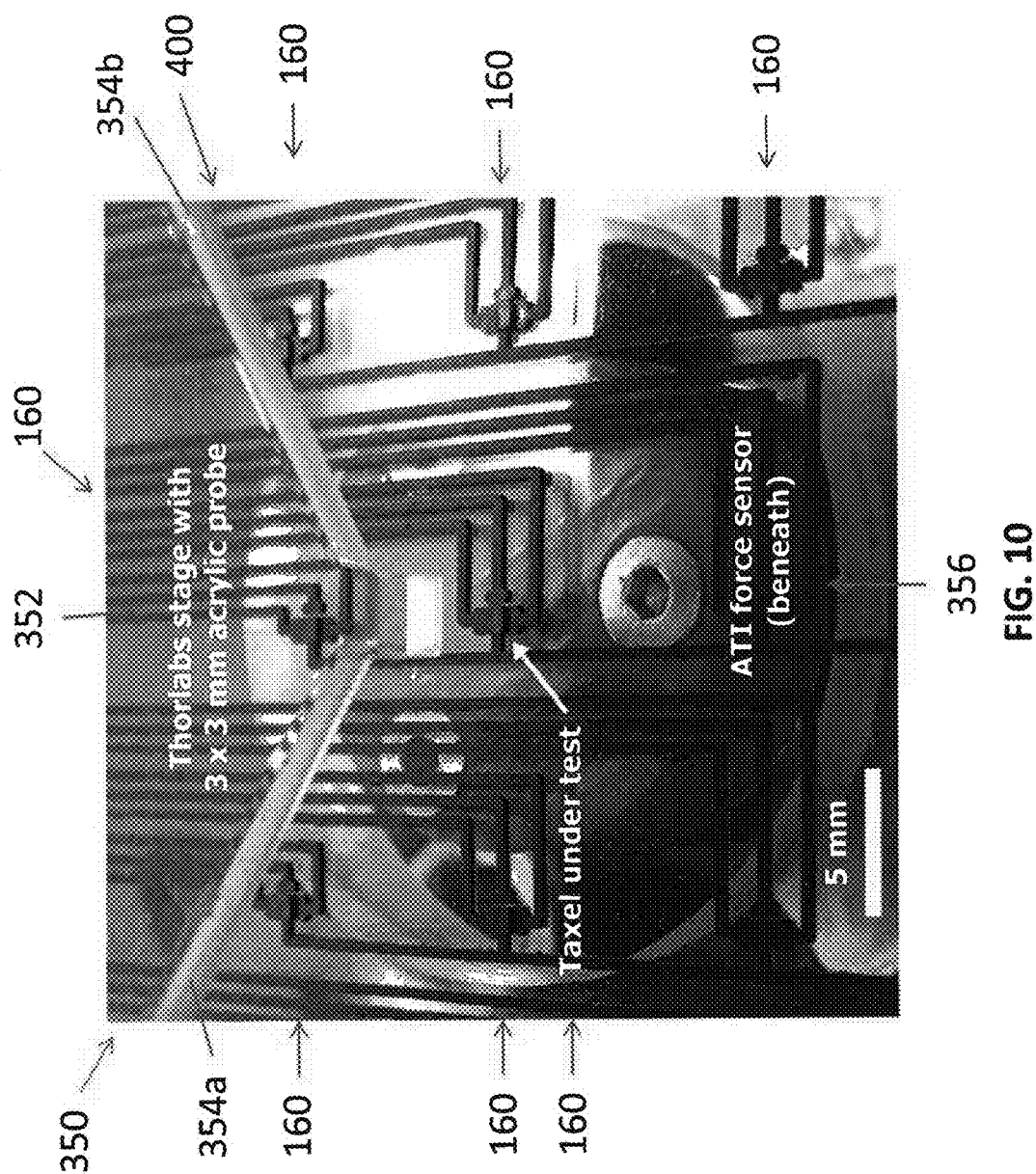
FIG. 10 illustrates a test setup for the robotic skin produced as described above with respect to FIGS. 5A-5E, 6, 7A-7B, 8 and 9.

FIG. 10 illustrates a test setup 350 for the robotic skin 400 produced as described above with respect to FIGS. 5A-5E, 6, 7A-7B, 8 and 9.

Normal and shear displacements were applied using a Thorlabs PT3-Z8 3-axis stage (designated by reference no. 352) equipped with a 3 by 3 mm acrylic probe (designated by reference nos. 354a and 354b), and resultant forces were collected with an ATI Nano17 6-axis force/torque sensor (designated by reference no. 356), FIG. 4. Contact resistances were measured via an Arduino Uno and voltage divider, described below with respect to FIG. 15, while capacitance was measured with an AD7745/46 evaluation board, described below with respect to FIG. 20. 3-axis testing was performed on a single taxel 160 for contact resistive sensing and on a single taxel 260 for capacitive sensing over 5 trials for each sensing modality.

5.2 Normal Force

Figure 11:
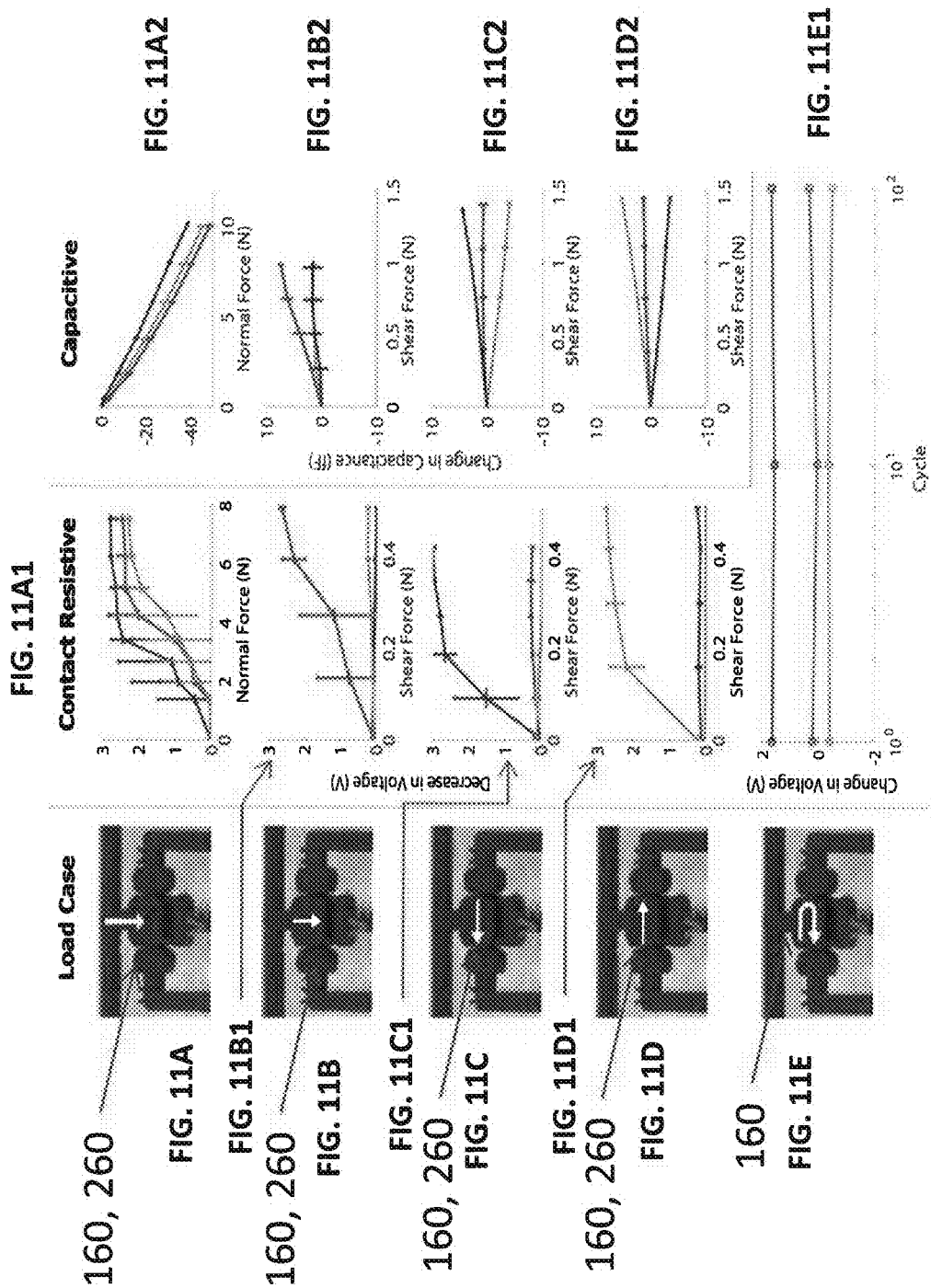
FIG. 11A illustrates a contact resistive tactile sensor or a capacitive tactile sensor according to embodiments of the present disclosure showing the direction of a compressive normal force for testing purposes.
FIG. 11B illustrates a contact resistive tactile sensor or a capacitive tactile sensor according to embodiments of the present disclosure showing one direction of a shear force for testing purposes.
FIG. 11C illustrates a contact resistive tactile sensor or a capacitive tactile sensor according to embodiments of the present disclosure showing another direction of a shear force for testing purposes.
FIG. 11D illustrates a contact resistive tactile sensor or a capacitive tactile sensor according to embodiments of the present disclosure showing still another direction of a shear force for testing purposes.
FIG. 11E illustrates a contact resistive tactile sensor according to embodiments of the present disclosure showing a cyclic shear force for testing purposes.

Referring to FIG. 11A, a normal force resulted in a decrease in voltage or decrease in capacitance across all 3 pads as intended. FIG. 11A1 is a graphical plot of the experimental results for the contact resistive tactile sensors or taxels 160 wherein the taxel 160 was unresponsive below 1 N, saturated above 8 N, and had a resolution of approximately 1 N. This was because below 1 N the pillar and pads were not yet in contact, while above 8 N the sensor can compress no further. The range can be tuned by adjusting the pillar height, pad height, and gap between pillar and pads, and is still useful for robotic manipulation applications [29]. Error bars represent 5 trials of a single taxel.

However, as illustrated in FIG. 11A2, by using capacitive sensing via capacitive tactile sensor 260, the range and resolution were significantly improved, up to 10 N and 100 mN, respectively. In this case, the interstitial PDMS dielectric enables finer motion of the pillar and pads without reaching saturation. This normal force dynamic range, 100:1, was greater than prior work [11], 42:1, due to the taller pillar and pad heights enabled from the milling manufacturing process (from 300 µm and 100 µm to 600 µm and 400 µm for the pillar and pad, respectively), although the gap was slightly larger (from 20 µm to 30 µm).

5.3 Shear Force

Referring to FIGS. 11B-11D, shear forces were applied in the direction of each pad. A small normal force of approximately 1-2 N was applied before shearing to improve contact between the acrylic probe and the taxel, while minimizing the influence of normal force on the results.

Referring to FIGS. 11B1-11D1, a decrease in voltage was observed across the intended pad in each shear case, while the voltage of the other pads remained relatively unchanged. Shear force range and resolution were approximately 450 mN and 100 mN, respectively for the contact resistance sensors. Higher shear forces couldn't be tested as the probe was observed to slip. The dynamic range in the normal and shear directions were similar, which was expected due to the FEA guided design that selected a geometry that was a compromise between the two sensing directions.

Referring to FIGS. 11B2-11D2, it can be seen that using the capacitive approach, shear force range and resolution were 1500 mN and 50 mN, respectively. Higher shear forces were possible due to the increased surface area between the PDMS encapsulation and acrylic probe.

5.4 Cyclic Loading

Referring to FIG. 11E, cyclic shear force testing was conducted on a contact resistive taxel by applying a moderate normal force of 4 N followed by loading and unloading of approximately 450 mN of shear force.

As can be seen in FIG. 11E1, the pad in the direction of loading, V3, decreased in voltage while the opposite pad, V1, increased in voltage, as intended. The magnitude of the increase in voltage was higher than the decrease due to the pad coming out of contact with pillar.

The out-of-plane pad, V2, experienced little change in voltage during testing with minor drift near the 100th cycle. No significant hysteresis was observed after 100 cycles.

5.5 Spatial Testing

Figure 12:
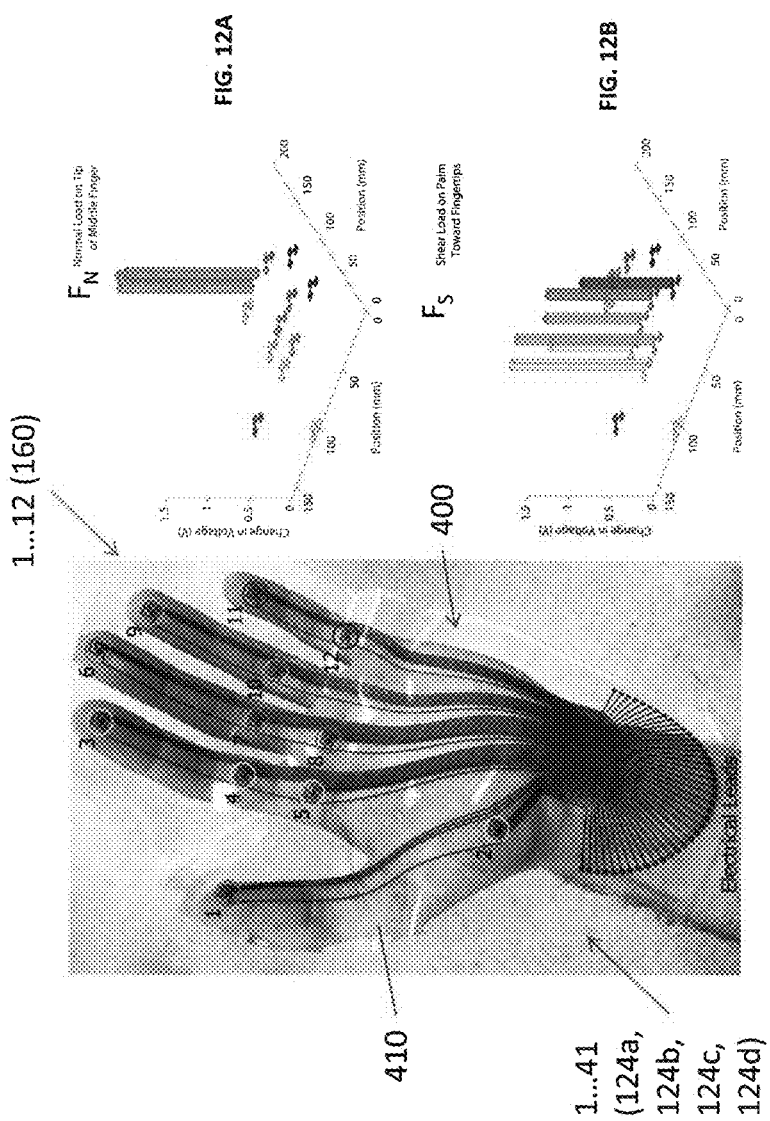
FIG. 12 is a robot skin the size of an adult human hand that has been manufactured according the steps illustrated in FIGS. 5A-5D for a contact resistive tactile sensor design having 12 sensors and 41 electrical leads according to embodiments of the present disclosure.
Figure 13:
FIG. 13 illustrates a close-up view of the 41 electrical leads showing how each particular electrical lead is connected to the respective one of the 12 sensors.
Figure 14:
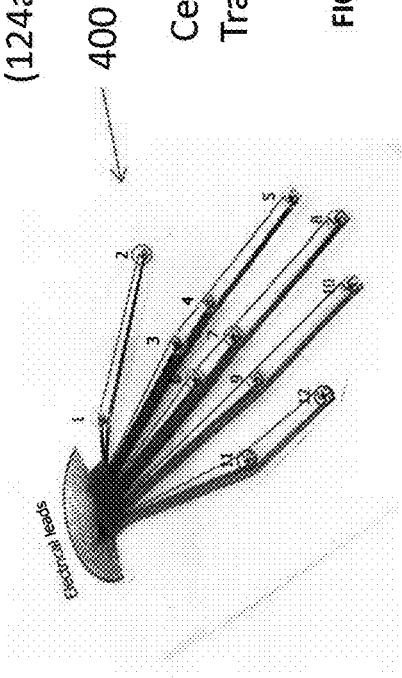
FIG. 14 illustrates a perspective view of the robot skin of FIG. 12 not applied to the adult human hand.

As illustrated in FIG. 12-14, a robot skin 400 the size of an adult human hand 410 was manufactured, and featured 1-12 three-sided contact resistive taxels or tactile sensors 160 that include the major projection 112 and three minor projections 114a, 114b, 114c representing the three sides with a total of 1-41 electrical leads (124a, 124b, 124c). Although the sensors 160 were manufactured as three-sided, a fourth minor projection could be added. (Note that the robot skin 400 illustrated in FIGS. 8 and 9 could be designed as the robot skin 400 applied to the size of an adult human hand 410 if the electrical leads are reconfigured accordingly).

The contact resistive tactile sensors 160 can sense shear and normal forces, and have features as small as 30 µm.

Snapshots of each test are shown in FIGS. 12A-12B. In all tests, low noise was seen in taxels not subjected to loading, where changes in voltage were less than 30 mV. FIG. 12A illustrates the change in voltage of the robot skin when subjected to a normal load applied to the tip of the middle finger (taxel 6). Each pad at the taxel of interest changes in voltage with roughly the same magnitude. In the normal force tests, all 3 pads at each taxel responded with roughly the same magnitude of change in voltage.

FIG. 12B illustrates the change in voltage of the robot skin when subjected to an upward-pointing (toward the fingertips) shear load applied to the palm area (taxels 4, 5, 7, 8, 10, and 12).

In the shear force tests, the pads which were being sheared towards experienced a change in voltage while out-of-plane pads remained relatively unchanged. This demonstrates the ability to achieve 3-axis force sensing over a large area using taxels with microscale features.

FIG. 15 illustrates a schematic diagram for a system 500 for measuring a sensed output of at least one contact resistive tactile sensor such as contact resistive tactile sensor 160 described above in FIGS. 1A-1C and FIGS. 7A-7B. The quantity of tactile sensors 160 may be sufficient to define an area having a magnitude sufficient to effectuate the robotic skin 400 illustrated in FIG. 12.

The system 500 includes at least one tactile sensor 160 and a microprocessor 520 in electrical communication with the one or more tactile sensors 160. The tactile sensor or sensors 160 each include the electrical leads 122 to the major projection 112 and electrical leads 124a, 124b, 124c, 124d as appropriate (see FIGS. 7A-7B). The system 500 may include a power supply 510, or be powered by other sources, and may be, in one embodiment, an Arduino Uno printed circuit board which requires 7-20 V DC power input and provides 5 V DC to a voltage divider 530 that is in electrical communication with the microprocessor 520 to enable electrical voltage potential readings 525 of V1, V2, V3, V4, as appropriate, of at least one contact resistive tactile sensor 160 at a time. The voltage divider 530 may include a 10 kΩ resistor. Since the contact resistance $A_{contact}$ is proportional to 1/(contact area), the initial contact resistance $A_{contact}$ is infinity because the contact area is zero initially. A maximum voltage reference reading is established as an unstressed condition between the major projection 112 and the at least second projection 114b. More particularly, in the unstressed condition, the voltage divider circuit is open to generate a maximum voltage reference reading of 5 Volts DC. As contact resistance $A_{contact}$ decreases with increase in contact area, a change or decrease in voltage is observed and measured, e.g., an electrical contact resistance is formed between the major projection 112 and at least the first minor projection 114a that represents movement caused by the compressive normal force $F_N$ or by the shear force $F_S$. Those skilled in the art will recognize that, and understand how, other circuitry could be applied to measure the contact resistance.

The sensor readings 525 may be provided as feedback to the microprocessor 520. The system 500 may be in electrical communication with one of a sensor measurement evaluation system or a robotic motion instrumentation and control system or combinations thereof, designated by reference numeral 535. The reading or readings 525 of the electrical contact resistance transmitted from the microprocessor 525 to the sensor measurement evaluation system or robotic motion instrumentation and control system or combinations thereof 535 for further action.

FIG. 16A illustrates a typical set of sensor readings 525 of voltage versus normal force $F_N$ (in N) for a contact resistive tactile sensor 160 such as illustrated in FIG. 11A.

FIG. 16B illustrates a typical set of sensor reading 525 of voltage versus shear force $F_S$ (in N) for a contact resistive tactile sensor 160 such as illustrated in FIG. 11A-11D or 11E.

6—Closed-Loop Slip Detection

Referring to FIGS. 17A-17C, a one degree-of-freedom (DoF) gripper 540 was prototyped to evaluate the robot skin's performance in a system. A single taxel or tactile sensor using the contact resistive approach 160 was mounted onto the tip of a movable robotic "thumb" 542 (see FIG. 17B). Together with a stationary robotic "finger" 544, the robotic "thumb" 542 and robotic "finger" 544 define a U-shaped cavity configured to receive a load test object 50. The gripper 540 is in electrical communication with voltage divider 530 that is controlled by microprocessor 520 such as the Arduino Uno described above with respect to FIG. 15. The gripper 540 is actuated by stepper motor 546.

Preliminary tests showed that the gripper 540 was capable of producing a grasp force up to 7-8 N, and was operated around 2-4 N during testing. A closed-loop program was written to: 1) close the thumb 542 until an object was gripped, 2) open the thumb if an object was gripped too tightly, 3) grip tighter if a high downward-pointing shear force was detected, and 4) fully open the thumb 542 if an upward-pointing shear force was detected.

The microprocessor 520 employed was an Arduino Uno for controlling purposes, and the controller was looped through every 250 ms (i.e., 4 Hz sampling rate).

Referring to FIG. 17C, a test was designed to have the gripper 540 grasp an object, and then load the object 50 with a 100 g mass 52 to induce slip.

Referring also to FIGS. 18A-18B, two cases were tested: with slip feedback OFF (FIG. 18A) and with slip feedback control ON (FIG. 18B). In both cases, the 3 pad voltages were nominal (5 V) while the thumb 542 was closing, followed by undulations during thumb-object contact until a soft but stable grasp was reached. When the 100 g mass 52 was applied (1 N of shear force), in both cases an increase in V1 and decrease in V3 was observed, which coincides with a downward-pointing shear force.

In the first case with slip feedback OFF per FIG. 18A, the object 50 was dropped and the pad voltages returned to their nominal value.

In the second case with slip feedback ON per FIG. 18B, the gripper 540 grasped tighter to prevent dropping the block 50, and a decrease in the average pad voltage was observed indicating a higher normal force.

In a manner analogous to system 500 described above with respect to FIG. 15, FIG. 19 illustrates a schematic diagram for a system 600 for measuring a sensed output of at least one capacitive tactile sensor such as capacitive tactile sensor 260 described above in FIGS. 2A-2C and FIGS. 11A-11E. Again, the quantity of tactile sensors 260 may be sufficient to define an area having a magnitude sufficient to effectuate the robotic skin 400 illustrated in FIG. 12.

The system 600 includes at least one tactile sensor 260 and a microprocessor 620 in electrical communication with the one or more tactile sensors 260 through a capacitive-to-digital converter 630 (such as, for example, an Analog Device AD7745/46 board) that may be in further electrical communication with a multiplexer 640. The multiplexer 640 and capacitive-to-digital converter 630 are in electrical communication with the microprocessor 620 to effectively be in parallel with one another via a "bypass" lead 622. The capacitive-to-digital converter 630 generally reads only one sensor at a time while the multiplexer 640 enables transferring to other sensors to obtain additional sensor readings. In an application such as to a robotic device or apparatus or system, the multiplexer 640 may be employed to enable readings from multiple sensors.

In a manner analogous to contact resistive sensor 160, the tactile sensor or sensors 260 each include electrical leads 222 to major projection 212 and electrical leads 224a, 224b, 224c, 224d . . . as appropriate to minor projections 214a, 214b, 214c, 214d (see FIGS. 7A-7B). The system 600 may include a power supply 610, or be powered by other sources, and may be powered through a separate electronic device such as a computer, etc.

The capacitive sensor readings 625 of C1, C2, C3 . . . may again be provided as feedback to the microprocessor 620. The system 600 may be in electrical communication with one of a sensor measurement evaluation system or a robotic motion instrumentation and control system or combinations thereof, designated by reference numeral 635. The reading or readings 625 of the electrical contact resistance transmitted from the microprocessor 620 to the sensor measurement evaluation system or robotic motion instrumentation and control system or combinations thereof 635 for further action.

In view of the foregoing, it can be appreciated that the system 600 for measuring a sensed output of at least one capacitive tactile sensor may be effected via the capacitive-to-digital converter 630 being in electrical communication with the multiplexer 640, or the multiplexer 640 may be omitted. The capacitive-to-digital converter 630 and the multiplexer 640 may be in electrical communication with the microprocessor 620 and with the one or more tactile sensors 260 via the electrical leads 222, 224a, 224b, 224c, etc. configured and disposed to enable reading 525 of the capacitance C1, C2, C3 upon application of an electrical voltage potential between the major projection 212 and the one or more minor projections 214.

FIG. 20 illustrates an assembled test setup for a capacitive tactile sensor 260 fabricated within an insulating layer 202. Testing was conducted by applying a displacement to the sensor 260 and reading the capacitances of each major projection 212 and/or minor projection 214a, 214b, 214c as well as the reaction forces. Micron-scale displacements were applied using a Thorlabs PT3-Z8 3-axis stage 270 equipped with a laser cut Delrin probe 280 which had a square probe tip area of 3×3 mm. Capacitance was measured using an AD7745/46 evaluation board (represented by microprocessor 620 in FIG. 19) with an observed resolution of 0.1 fF at a sampling rate of 16 Hz (unless otherwise noted). Forces were acquired using an ATI Nano17 6-axis force/torque sensor 290.

FIG. 21A illustrates the shear force from the ATI Nano17 6-axis force/torque sensor 290 versus time exhibits a step-like behavior when subject to incremental displacements.

Figure 19:
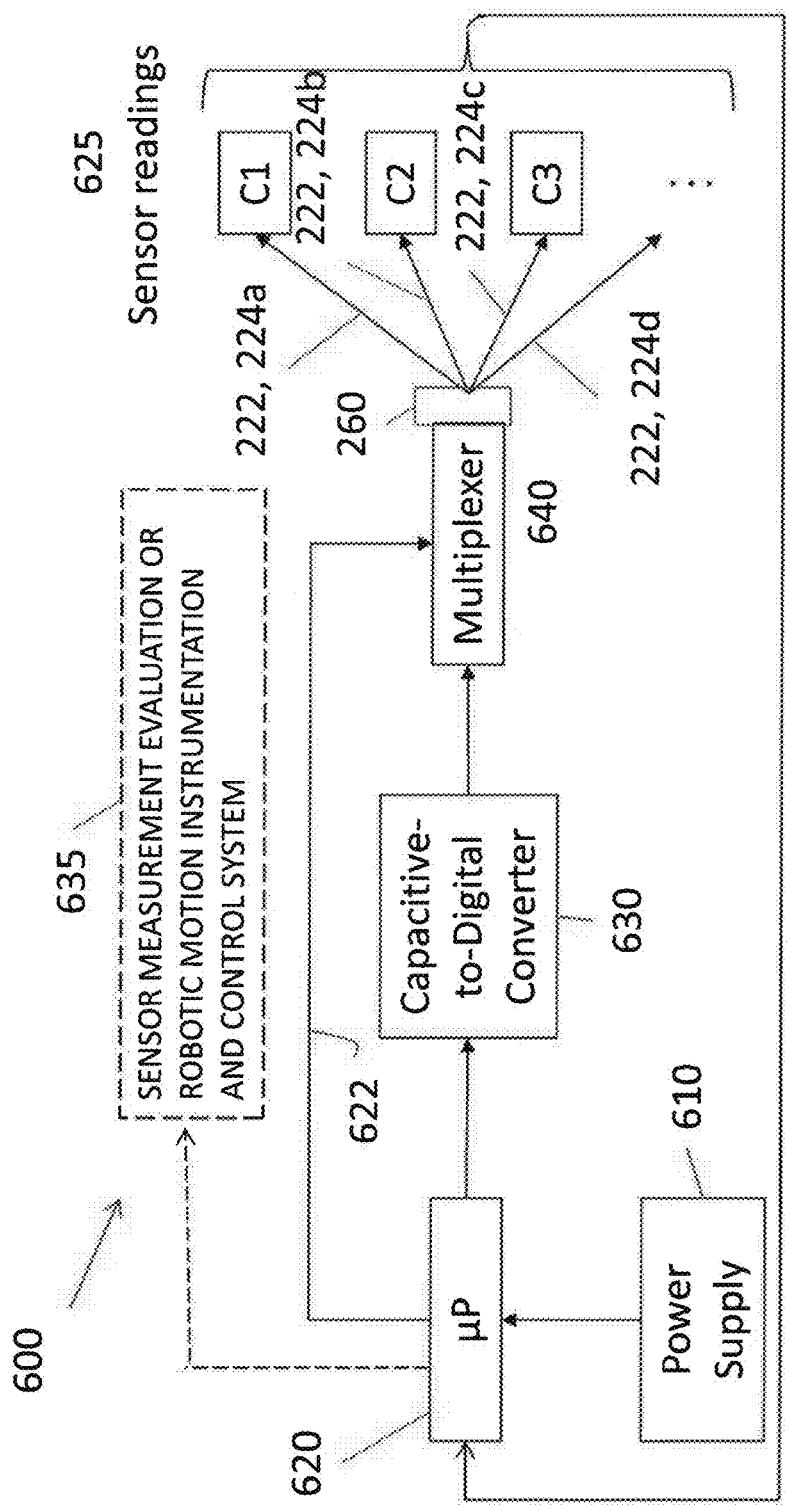
FIG. 19 illustrates a schematic diagram for a system for measuring a sensed output of at least one capacitive tactile sensor according to embodiments of the present disclosure such as illustrated in FIGS. 2A-2C and FIGS. 11A-11D.

FIG. 21B illustrates the change in capacitance versus time from the AD7745/46 evaluation board (represented by microprocessor 620 in FIG. 19).

At higher force readings, a slight decay is apparent in the ATI signal which may be due to polymer relaxation in the sensor, so the median value over the step was used.

7—Extensions of Manufacturing Process

Figure 22:
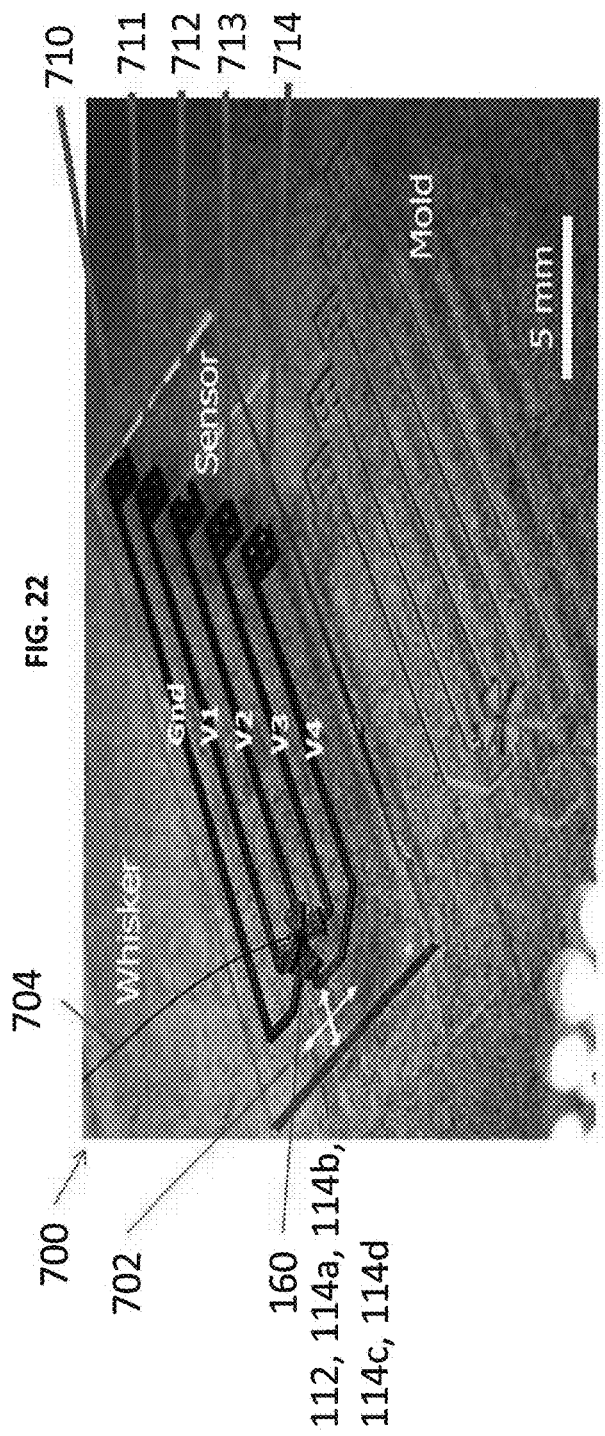
FIG. 22 illustrates a contact resistive tactile sensor according to embodiments of the present disclosure modified to accommodate four pads and a rat whisker press-fit into the center pillar wherein as the rat whisker is detected, the pillar comes into physical contact with the adjacent pads.
Figure 23:
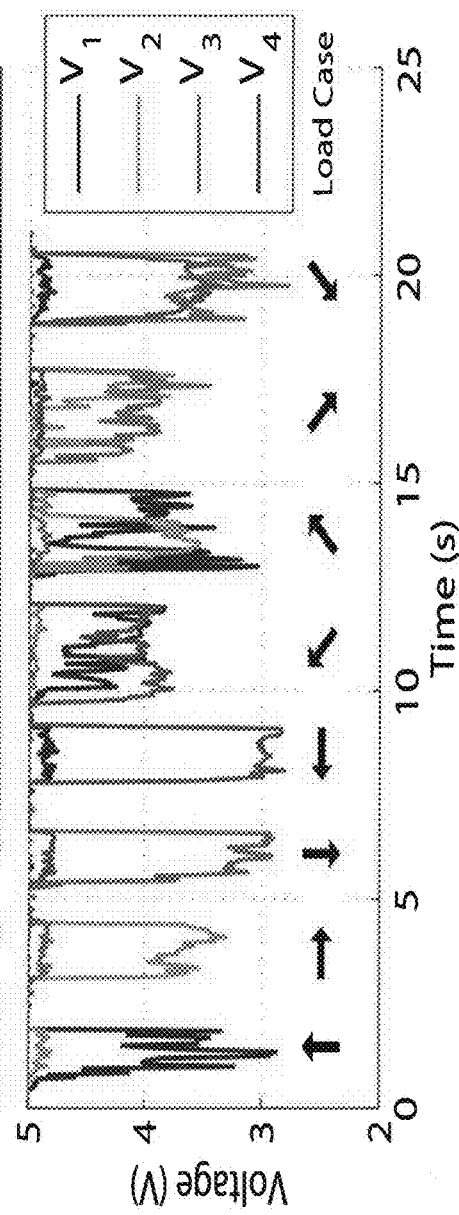
FIG. 23 illustrates a graphical plot of eight load cases tested for the rat-whisker modified contact resistive tactile sensor of FIG. 23: 4 cardinal directions and 4 diagonal directions.

Turning now to FIGS. 22-23, the developed milling-based manufacturing process and sensing modality is versatile and adaptable, and can be used to create other elastomer MEMS sensors.

For example, referring to FIG. 22, the presented 3-axis tactile sensor architecture can be adjusted as, for example, a contact resistive sensor 700 that includes contact resistive sensor 160 having four minor projections such as minor pads 114a, 114b, 114c shown in FIGS. 7A-7B that accommodate a natural rat whisker 704 adhered to the pillar 112, as well as the four adjacent pads using a smaller 101 μm endmill (Microcut USA, 82004)

The contact resistive sensor 700 includes insulating layer 702 and electrical lead 710 as ground from pillar 112 and electrical leads 711, 712, 713, 714 to measure V1, V2, V3, V4 from pads 114a, 114b, 114c, 114d, respectively.

As the whisker 704 is deformed in the shear directions, the pillar 112 and pads 114a, 114b, 114c, 114d come into physical contact resulting in a decrease in voltage V1, V2, V3, V4 as shown in FIG. 23. This could enable robots to navigate in the dark [30], or even be repurposed as a flow sensor in which a passing fluid deforms the whisker 704.

Figure 24:
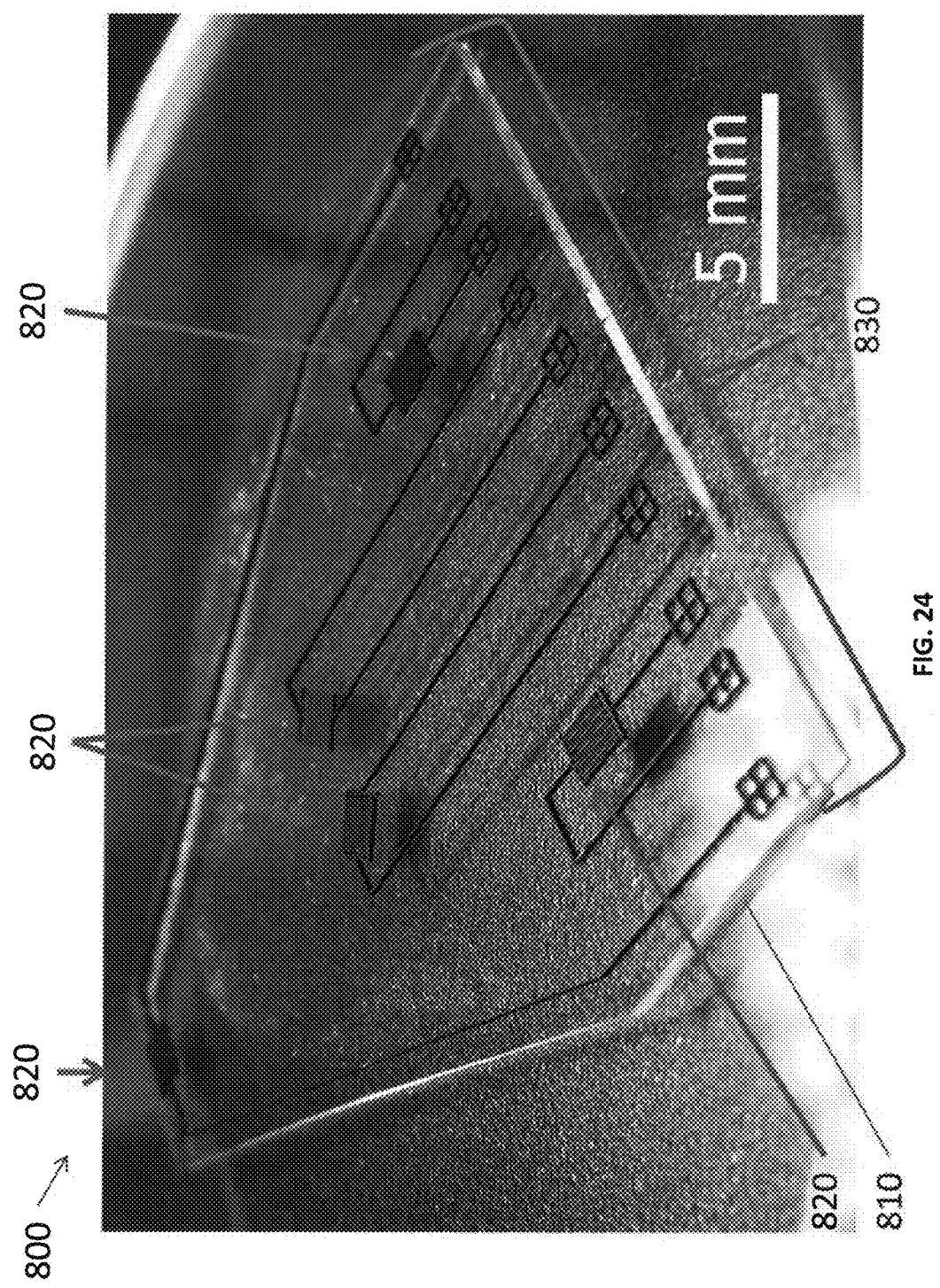
FIG. 24 illustrates another example of a tactile sensor according to embodiments of the present disclosure that is exemplified by a flexible strain sensing skin, such as an artificial moth wing, wherein interdigitated electrode structures provide capacitive tactile sensing capability analogous to the capacitive tactile sensor illustrated in FIGS. 2A-2C.

FIG. 24 illustrates another example of a tactile sensor exemplified by a flexible strain sensing skin, such as an artificial moth wing 800. Interdigitated electrode structures 820 provide capacitive tactile sensing capability analogous to the capacitive tactile sensor 260 described in FIGS. 2A-2C.

The interdigitated electrode structures 820 are encapsulated in an insulating layer 810 and are in electrical communication with electrode leads 830. The electrode leads 830 are exposed to enable electrical contact with the sensing mechanism.

The interdigitated structures 820 elongate in the direction of strain and cause an increase in capacitance due to the increase in inter-electrode area [31]. In this case, a 101 μm in diameter endmill (Microcut USA, 82004) was used to create interdigitated structures with digit widths of 101 μm, depth of 200 μm, and electrode gaps of 90 μm. The mold covered an area of roughly 2 in by 4 in with strain gauges oriented in a fashion similar to other moth wing designs [32].

Figure 25:
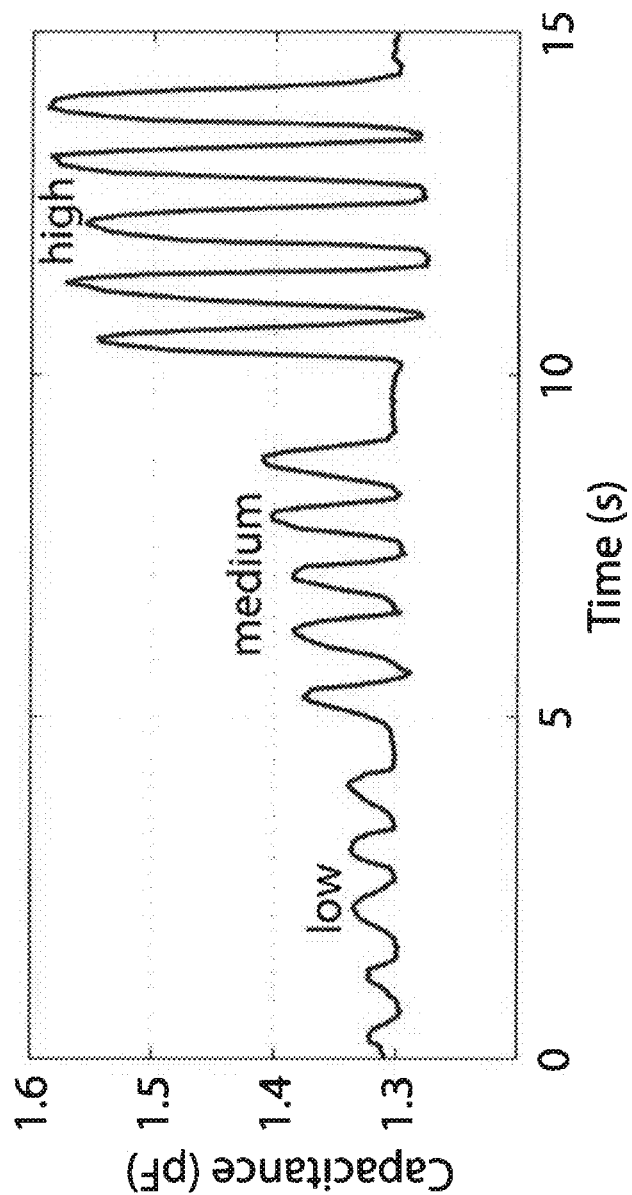
FIG. 25 illustrates test results for the artificial moth wing of FIG. 25 wherein a single strain gauge on the moth wing is stretched by hand, and capacitance was collected versus time at low, medium, and high strains.

FIG. 25 illustrates test results wherein a single strain gauge on the moth wing 800 was stretched by hand, and capacitance was collected using the aforementioned AD7745/46 evaluation board (representing microprocessor 620 in FIG. 19 described above). Five cycles were stretched at low, medium, and high strains, where low strain was measured on the order of 100's of microstrain using digital calipers.

Figure 26:
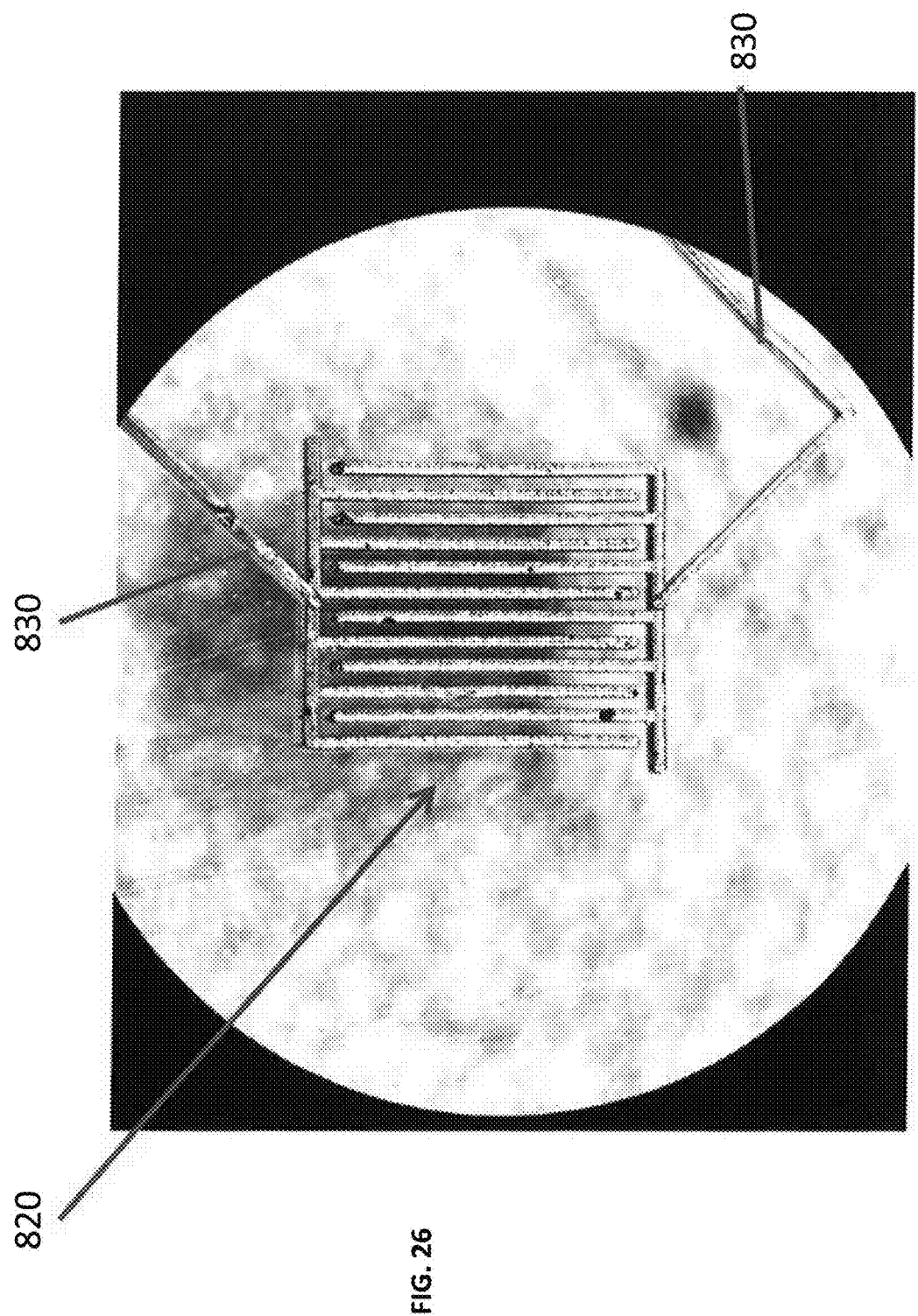
FIG. 26 is a magnified view of one of the interdigitated electrodes of the artificial moth wing of FIG. 24 showing the electrode leads to the interdigitated electrodes.

FIG. 26 is a magnified view of one of the interdigitated electrodes 820 showing the electrode leads 830.

FIGS. 27A-27E illustrate the method of manufacturing the interdigitated electrodes 820.

The method is analogous to the method of manufacturing the contact resistive tactile sensors 160 and the capacitive tactile sensors 260 described above with respect to FIGS. 5A-5E.

For simplicity, since the method of manufacturing the interdigitated electrodes 820 is essentially identical to the method of manufacturing described above with respect to FIGS. 5A-5E, only the differences in the structure of the interdigitated electrodes 820 as they relate to the manufacturing method are described.

Accordingly, FIGS. 27A-27D illustrate sequential steps in manufacturing the interdigitated electrodes 820 to perform in an analogous manner as either contact resistance tactile sensor 100 or capacitive tactile sensor 200.

FIG. 27E illustrates an additional step of applying an additional quantity of the material forming the insulating layer 202' to form an additional portion 202c' of the insulating layer to encapsulate an interdigitated electrode 820' performing in an analogous manner as capacitive tactile sensor 200 for capacitive sensing.

More particularly, FIG. 27A illustrates a mold 300' being milled by mill 305 to define a pattern of trenches 320', etc. in the mold 300' wherein the pattern of trenches is formed such that applying a conductive material filling the mold pattern of trenches to form interdigitated electrode 820. Again, the mold 300' may be made from a transparent material such as acrylic.

FIG. 27B illustrates instrument 315 such as a blade or brush that applies conductive material 120 such as CNT/PDMS to fill the pattern of trenches 320' with the conductive material 120 to form at least one interdigitated electrode 820 in the pattern of trenches 320. Gaps are also formed between the individual electrode sheets of the interdigitated electrode 820 to enable performance as a contact resistive tactile sensor when the gaps are unfilled and to enable performance as a capacitive tactile sensor when the gaps are filled with the conductive material 120.

FIG. 27C illustrates material forming the insulating layer 102 being poured from vessel 325 to form the insulating layer 102 from which the groups of flexible electrode sheets or projections of the interdigitated electrode 820 project orthogonally from the insulating layer 102 as described above with respect to FIGS. 1A-1C, or analogously to form the insulating layer 202' from which the groups of flexible electrode sheets or projections project orthogonally as described above with respect to FIGS. 2A-2C.

FIG. 27D illustrates the completed contact resistive tactile sensor 820 in the form of an interdigitated electrode (or alternatively an incomplete capacitive tactile sensor 820' in FIG. 27E in the form of an interdigitated electrode) being separated or peeled from the mold 300'.

In conjunction with FIGS. 2A-2C, FIG. 27E illustrates the completion of capacitive tactile sensor 820' in the form of an interdigitated electrode by filling the gaps between the electrode sheets with the additional portion 202c' of the insulating layer 202' to encapsulate the capacitive tactile sensor 820' for capacitive sensing.

8—Limitations

In the present disclosure, rapid manufacturing of large area robot skins with 3-axis contact resistive sensing has been demonstrated and, as such, provides a major, heretofore unachievable advantage over the prior art. Dynamic range can be partly mitigated by tuning the taxel geometry, but still lacks the dynamic range of some previous 3-axis sensors [33, 11]. In the future, dynamic range could potentially be improved by using a rounded contact area rather than flat; this may reduce the deviations between trials. However, capacitive sensing was able to dramatically improve dynamic range; from 8:1 to 100:1 in the normal direction, and from 5:1 to 30:1 in the shear directions. It was also found that at high normal forces (above 8 N), the taxels became relatively insensitive to shear forces as the compressed sensor could not deform further; this is an inherent limitation of the contact resistive approach.

During fabrication, a high amount of force is applied to the acrylic mold as the CNT/PDMS is planarized by hand. During this step, it was found that small gaps tend to break. With a gap of 30 μm, yield was estimated at 80-90%. In the future, larger gaps could be fabricated to improve yield while also increasing the normal force range, or a more delicate planarization process could be employed using liquids like isopropyl alcohol (IPA). A metal instead of acrylic, such as aluminum or steel, could also be used as the stock material to improve gap yield strength.

The contact resistive sensor architecture left the sensing elements exposed to the environment, which could potentially lead to damage from repeated use. Also, conductive objects such as metals were not compatible with this architecture since they created an electrical short between the pillar and pads. A thin insulating film, such as plastic wrap, can be placed on top of the robot skin to mitigate this.

Electrical routing was fabricated in the same plane as the sensors, limiting the taxel areal density and number of pads per pillar. However, taxel density can increase if a smaller array (ex: 3 by 3 with a spacing of 3 mm, ideal for fingertips) is desired because the amount of routing is significantly less.

A smaller diameter endmill for the routing could also be used, as was used in the rat whisker sensor to enable 4 pads per pillar. A more integrated approach would be to mill vias and traces directly into the backside of the robot skin. This step would be done just before peeling the robot skin from the mold (i.e., before the last step in FIG. 3). Then, the vias and traces would be refilled and planarized with CNT/PDMS.

9—Conclusion

This work presented a rapid and affordable manufacturing process based on CNC milling, and featured a 3-axis tactile sensor architecture that can use either contact resistance or capacitance to sense forces. The manufacturing process produced features as small as 30 μm, without the need of a clean room, over an area as large as an adult hand. Dynamic range was approximately 8:1 and 5:1 in the shear and normal directions when measuring contact resistance, while capacitive sensing can be used to drastically improve dynamic range up to 100:1. A robot skin was shown to measure shear and normal forces across a large area, and a one DoF gripper was built with a single taxel to demonstrate successful detection and prevention of slip. The ability to quickly manufacture flexible skins will help accelerate the pace of elastomer-based sensor research, and result in new conductive elastomeric sensors.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

REFERENCES

The following references are incorporated herein by reference in their entirety:

[1] Hanna Yousef, Mehdi Boukallel, and Kaspar Althoefer. Tactile sensing for dexterous in-hand manipulation in robotics a review. Sensors and Actuators A: physical, 167(2):171-187, 2011.

[2] Carmel Majidi. Soft robotics: a perspective current trends and prospects for the future. Soft Robotics, 1(1): 5-11, 2014.

[3] Rui Li, Robert Platt, Wenzhen Yuan, Andreas ten Pas, Nathan Roscup, Mandayam A Srinivasan, and Edward Adelson. Localization and manipulation of small parts using gelsight tactile sensing. In Intelligent Robots and Systems (IROS 2014), 2014 IEEE/RSJ International Conference on, pages 3988-3993. IEEE, 2014.

[4] Barrett Heyneman and Mark R Cutkosky. Slip classification for dynamic tactile array sensors. The International Journal of Robotics Research, 2015.

[5] Aaron M Dollar and Hugh Herr. Lower extremity exoskeletons and active orthoses: challenges and state-of-the-art. Robotics, IEEE Transactions on, 24(1):144-158, 2008.

[6] Stacy J Morris and Joseph A Paradiso. Shoe-integrated sensor system for wireless gait analysis and real-time feedback. In Engineering in Medicine and Biology, 2002. 24th Annual Conference and the Annual Fall Meeting of the Biomedical Engineering Society EMBS/BMES Conference, 2002. Proceedings of the Second Joint, volume 3, pages 2468-2469. IEEE, 2002.

[7] Christian Liedtke, Steven A W Fokkenrood, Jasper T Menger, Herman van der Kooij, and Peter H Veltink. Evaluation of instrumented shoes for ambulatory assessment of ground reaction forces. Gait & posture, 26(1): 39-47, 2007.

[8] Dustyn P Roberts, Jack Poon, Daniella Patrick, and Joo H Kim. Testing pressurized spacesuit glove torque with an anthropomorphic robotic hand. In Robotics and Automation (ICRA), 2012 IEEE International Conference on, pages 1520-1525. IEEE, 2012.

[9] Sarah Walsh, Daniel Barta, Ryan Stephan, and Stephen Gaddis. Next generation life support (ngls): High performance eva glove (hpeg) technology development element. http://ntrs.nasa.gov/archivehasa/casi.ntrs.nasa.gov/20150023265.pdf, 2015. [Online; accessed 12 May 2016].

[10] Eric V Eason, Elliot W Hawkes, Marc Windheim, David L Christensen, Thomas Libby, and Mark R Cutkosky. Stress distribution and contact area measurements of a gecko toe using a high-resolution tactile sensor. Bioinspiration & biomimetics, 10(1):016013, 2015.

[11] Alexi Charalambides and Sarah Bergbreiter. A novel all-elastomer mems tactile sensor for high dynamic range shear and normal force sensing. Journal of Micromechanics and Microengineering, 25(9):095009, 2015.

[12] Hyung-Kew Lee, Jaehoon Chung, Sun-Il Chang, and Euisik Yoon. Realtime measurement of the three-axis contact force distribution using a flexible capacitive polymer tactile sensor. Journal of Micromechanics and Microengineering, 21(3):035010, 2011.

[13] Cheng-Wen Ma, Li-Sheng Hsu, Jui-Chang Kuo, and Yao-Joe Yang. A flexible tactile and shear sensing array fabricated using a novel buckypaper patterning technique. Sensors and Actuators A: Physical, 231:21-27, 2015.

[14] Yoshiyuki Ohmura, Yasuo Kuniyoshi, and Akihiko Nagakubo. Conformable and scalable tactile sensor skin for curved surfaces. In Robotics and Automation, 2006. ICRA 2006. Proceedings 2006 IEEE International Conference on, pages 1348-1353. IEEE, 2006.

[15] Vincent Duchaine, Nicolas Lauzier, Mathieu Baril, Marc-Antoine Lacasse, and Clement Gosselin. A flexible robot skin for safe physical human robot interaction. In Robotics and Automation, 2009. ICRA'09. IEEE International Conference on, pages 3676-3681. IEEE, 2009.

[16] Giorgio Cannata, Marco Maggiali, Giorgio Metta, and Giulio Sandini. An embedded artificial skin for humanoid robots. In Multisensor Fusion and Integration for Intelligent Systems, 2008. MFI 2008. IEEE International Conference on, pages 434-438. IEEE, 2008.

[17] Yong-Lae Park, Carmel Majidi, Rebecca Kramer, Phillipe Berard, and Robert J Wood. Hyperelastic pressure sensing with a liquid-embedded elastomer. Journal of Micromechanics and Microengineering, 20(12):125029, 2010.

[18] Ming-Yuan Cheng, Chun-Liang Lin, Yu-Tse Lai, and Yao-Joe Yang. A polymer-based capacitive sensing array for normal and shear force measurement. Sensors, 10(11): 10211-10225, 2010.

[19] Soonjae Pyo, Jae-lk Lee, Min-Ook Kim, Taeyoung Chung, Yongkeun Oh, Soo-Chul Lim, Joonah Park, and Jongbaeg Kim. Development of a flexible three-axis tactile sensor based on screen-printed carbon nanotube-polymer composite. Journal of Micromechanics and Microengineering, 24(7):075012, 2014.

[20] Letizia Ventrelli, Lucia Beccai, Virgilio Mattoli, Arianna Menciassi, and Paolo Dario. Development of a stretchable skin-like tactile sensor based on polymeric composites. In Robotics and Biomimetics (ROBIO), 2009 IEEE International Conference on, pages 123-128. IEEE, 2009.

[21] Le Cai, Li Song, Pingshan Luan, Qiang Zhang, Nan Zhang, Qingqing Gao, Duan Zhao, Xiao Zhang, Min Tu, Feng Yang, et al. Superstretchable, transparent carbon nanotube-based capacitive strain sensors for human motion detection. Scientific reports, 3, 2013.

[22] Aaron P Gerratt, Hadrien O Michaud, and Stephanie P Lacour. Elastomeric electronic skin for prosthetic tactile sensation. Advanced Functional Materials, 25(15):2287-2295, 2015.

[23] Karsten Weiss and Heinz Worn. The working principle of resistive tactile sensor cells. In Mechatronics and Automation, 2005 IEEE International Conference, volume 1, pages 471-476. IEEE, 2005.

[24] Andreas E Guber, Mathias Heckele, Dirk Herrmann, Alban Muslija, Volker Saile, Lutz Eichhorn, Thomas Gietzelt, Werner Hoffmann, Peter C Hauser, Jatisai Tanyanyiwa, et al. Microfluidic lab-on-a-chip systems based on polymers fabrication and application. Chemical Engineering Journal, 101(1):447-453, 2004.

[25] Kosuke Iwai, Kuan Cheng Shih, Xiao Lin, Thomas A Brubaker, Ryan D Sochol, and Liwei Lin. Finger-powered microfluidic systems using multilayer soft lithography and injection molding processes. Lab on a Chip, 14(19): 3790-3799, 2014.

[26] Dario Carugo, Jeong Yu Lee, Anne Pora, Richard J Browning, Lorenzo Capretto, Claudio Nastruzzi, and Eleanor Stride. Facile and cost effective production of microscale pdms architectures using a combined micromilling-replica moulding (umi-rem) technique. Biomedical microdevices, 18(1):1-10, 2016.

[27] Paul Day, Eric V Eason, Noe Esparza, David Christensen, and Mark Cutkosky. Microwedge machining for the manufacture of directional dry adhesives. Journal of Micro and Nano-Manufacturing, 1(1):011001, 2013.

[28] Philip N Duncan, Siavash Ahrar, and Elliot E Hui. Scaling of pneumatic digital logic circuits. Lab on a Chip, 15(5):1360-1365, 2015.

[29] Robert D Howe. Tactile sensing and control of robotic manipulation. Advanced Robotics, 8(3):245-261, 1993.

[30] S W Yan, Matthew M Gra, and Mitra J Z Hartmann. Mechanical responses of rat vibrissae to airflow. Journal of Experimental Biology, 219(7):937-948, 2016.

[31] Hee-sup Shin, Alexi Charalambides, Ivan Penskiy, and Sarah Bergbreiter. A soft microfabricated capacitive sensor for high dynamic range strain sensing. In Intelligent Robots and Systems. IEEE/RSJ, 2016.

[32] A L Eberle, B H Dickerson, P G Reinhall, and T L Daniel. A new twist on gyroscopic sensing: body rotations lead to torsion in flapping, flexing insect wings. Journal of The Royal Society Interface, 12(104):20141088, 2015.

[33] Chih-Fan Hu, Wang-Shen Su, and Weileun Fang. Development of patterned carbon nanotubes on a 3d polymer substrate for the flexible tactile sensor application. Journal of Micromechanics and Microengineering, 21(11):115012, 2011.

What is claimed is:

1. At least one tactile sensor comprising:
an insulating layer defining a surface; and
a conductive layer formed on the surface of the insulating layer,
the conductive layer defining at least one group of flexible projections extending orthogonally from the surface of the insulating layer,
the at least one group of flexible projections including
a major projection extending a distance orthogonally from the surface of the insulating layer; and
at least one minor projection that is adjacent to and separate from the major projection,
the at least one minor projection extending orthogonally a distance from the surface of the insulating layer,
wherein the major projection extends a distance orthogonally from the surface of the insulating layer that is greater than the distance by which the at least one minor projection extends orthogonally from the surface of the insulating layer.

2. The at least one tactile sensor according to claim 1, wherein the at least one group of flexible projections are configured and disposed on the surface of the insulating layer such that upon being subjected to a compressive force normal to the surface of the insulating layer, the major projection and the at least one minor projection flex such that an electrical contact resistance is formed between the major projection and the at least one minor projection that represents movement caused by the compressive normal force.

3. The at least one tactile sensor according to claim 2, further comprising an electrical lead in electrical communication with the major projection and an electrical lead in electrical communication with the at least one minor projection, the electrical leads configured and disposed to enable reading of the electrical contact resistance upon application of an electrical voltage potential between the major projection and the at least one minor projection.

4. The at least one tactile sensor according to claim 3, wherein the at least one tactile sensor defines an array of tactile sensors having an area magnitude sufficient to effectuate a robotic skin.

5. The at least one tactile sensor according to claim 1, wherein the at least one minor projection includes at least first and second minor projections,
wherein the at least one group of flexible projections are configured and disposed on the surface of the insulating layer such that upon being subjected to a shear force parallel to the surface of the insulating layer, the major projection and the first minor projection flex such that an electrical contact resistance is formed between the major projection and the first minor projection that represents movement caused by the shear force.

6. The at least one tactile sensor according to claim 5, further comprising an electrical lead in electrical communication with the major projection and an electrical lead in electrical communication with the at least one minor projection, the electrical leads configured and disposed to enable reading of the electrical contact resistance upon application of an electrical voltage potential between the major projection and the at least one minor projection.

7. The at least one tactile sensor according to claim 6, wherein the at least one tactile sensor defines an array of tactile sensors having an area magnitude sufficient to effectuate a robotic skin.

8. The at least one tactile sensor according to claim 1,
wherein the at least one group of flexible projections are configured and disposed on the surface of the insulating layer such that at least one gap is formed between at least one lateral surface of the major projection and at least one lateral surface of the at least one minor projection,
wherein material forming the insulating layer is configured and disposed sufficiently to encapsulate the at least one group of flexible projections such that the material forming the insulating layer fills the at least one gap formed between the at least one lateral surface of the major projection and at least one lateral surface of the at least one minor projection, and
wherein the material forming the insulating layer filling the at least one gap formed between the at least one lateral surface of the major projection and at least one lateral surface of the at least one minor projection effects a dielectric presence between the major projection and the at least one minor projection to enable a capacitance reading therebetween.

9. The at least one tactile sensor according to claim 8, further comprising an electrical lead in electrical communication with the major projection and an electrical lead in electrical communication with the at least one minor projection, the electrical leads configured and disposed to enable reading of the capacitance upon application of an electrical voltage potential between the major projection and the at least one minor projection.

10. The at least one tactile sensor according to claim 9, wherein the at least one tactile sensor defines an array of tactile sensors having an area magnitude sufficient to effectuate a robotic skin.

11. A method of manufacturing at least one tactile sensor comprising:
providing a molding layer having a mold pattern of trenches defined therein;
applying a conductive material to fill the mold pattern of trenches to define at least one conductive layer therein; and
applying a layer of insulating material to the conductive material filling the mold pattern of trenches,
wherein the mold pattern of trenches is formed such that the applying the conductive material defines at least one group of flexible projections including
a major projection extending a distance orthogonally from the surface of the insulating layer; and
at least one minor projection that is adjacent to and separate from the major projection,
the at least one minor projection extending orthogonally a distance from the surface of the insulating layer,
wherein the major projection extends a distance orthogonally from the surface of the insulating layer that is greater than the distance by which the at least one minor projection extends orthogonally from the surface of the insulating layer.

12. The method of manufacturing at least one tactile sensor according to claim 11, further comprising forming the mold pattern such that the at least one group of flexible projections on the surface of the insulating layer is configured and disposed such that upon being subjected to a compressive force normal to the surface of the insulating layer, the major projection and the at least one minor projection flex such that an electrical contact resistance is formed between the major projection and the at least one minor projection that represents movement caused by the compressive normal force.

13. The method of manufacturing at least one tactile sensor according to claim 12, further comprising providing an electrical lead in electrical communication with the major projection and providing an electrical lead in electrical communication with the at least one minor projection such that the electrical leads are configured and disposed to enable reading of the electrical contact resistance upon application of an electrical voltage potential between the major projection and the at least one minor projection.

14. The method of manufacturing at least one tactile sensor according to claim 13, further comprising forming the mold pattern such that the at least one tactile sensor defines an array of tactile sensors having an area magnitude sufficient to effectuate a robotic skin.

15. The method of manufacturing at least one tactile sensor according to claim 11, wherein the at least one minor projection includes at least first and second minor projections, the method further comprising
forming the mold pattern such that the at least one group of flexible projections are configured and disposed on the surface of the insulating layer such that upon being subjected to a shear force parallel to the surface of the insulating layer, the major projection and the first minor projection flex such that an electrical contact resistance is formed between the major projection and the first minor projection that represents movement caused by the shear force.

16. The method of manufacturing at least one tactile sensor according to claim 15, further comprising providing an electrical lead in electrical communication with the major projection and an electrical lead in electrical communication with the at least one minor projection such that the electrical leads are configured and disposed to enable reading of the electrical contact resistance upon application of an electrical voltage potential between the major projection and the at least one minor projection.

17. The method of manufacturing at least one tactile sensor according to claim 16, further comprising forming the mold pattern such that the at least one tactile sensor defines an array of tactile sensors having an area magnitude sufficient to effectuate a robotic skin.

18. The method of manufacturing at least one tactile sensor according to claim 11, further comprising:
forming the mold pattern such that the at least one group of flexible projections are configured and disposed on the surface of the insulating layer such that at least one gap is formed between at least one lateral surface of the major projection and at least one lateral surface of the at least one minor projection; and
filling the at least one gap formed between the at least one lateral surface of the major projection and at least one lateral surface of the at least one minor projection with the material of the insulating layer to effect a dielectric presence between the major projection and the at least one minor projection to enable a capacitance reading therebetween.

19. The method of manufacturing at least one tactile sensor according to claim 18, further comprising
providing an electrical lead in electrical communication with the major projection and an electrical lead in electrical communication with the at least one minor projection such that the electrical leads are configured and disposed to enable reading of the capacitance upon application of an electrical voltage potential between the major projection and the at least one minor projection.

20. The method of manufacturing at least one tactile sensor according to claim 19, further comprising forming the mold pattern such that the at least one tactile sensor defines an array of tactile sensors having an area magnitude sufficient to effectuate a robotic skin.

\* \* \* \* \*